US012810311B1

(12) United States Patent
Gu et al.

(10) Patent No.: US 12,810,311 B1
(45) Date of Patent: Nov. 24, 2026

(54) AGENT-BASED DATA OPERATION SYSTEM FOR DATA GOVERNANCE

(71) Applicant: Zoom Communications, Inc., San Jose, CA (US)

(72) Inventors: Xingrui Gu, Hefei (CN); Yu Gu, Hefei (CN); Shenghua Li, Hefei (CN); Xu Hua Li, San Jose, CA (US); Tengteng She, Hefei (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 19/092,570

(22) Filed: Mar. 27, 2025

(51) Int. Cl.
*G06Q 30/018* (2023.01)
*G06Q 30/02* (2023.01)

(52) U.S. Cl.
CPC .................................. *G06Q 30/018* (2013.01)

(58) Field of Classification Search
CPC .......... G06Q 30/018; G06Q 30/0207–30/0277
See application file for complete search history.

(56) References Cited

U.S. PATENT DOCUMENTS 12,136,055 B2 11/2024 Barday et al.
12,511,305 B1 * 12/2025 Maghnani ............. G06F 16/254
2007/0143581 A1 6/2007 Mansell
2008/0295105 A1 11/2008 Ozer et al.
2011/0093957 A1 * 4/2011 Ciano ..................... G06F 21/64 726/26
2012/0124431 A1 * 5/2012 Bauer ..................... H04L 69/28 714/E11.067
2016/0234186 A1 * 8/2016 Leblond .................. H04L 67/34
2019/0179799 A1 6/2019 Barday et al.
2019/0332802 A1 10/2019 Barday et al.
2019/0332803 A1 10/2019 Barday et al.
2020/0117829 A1 4/2020 Barday et al.
2020/0184739 A1 * 6/2020 Nathan .................. G06Q 10/20
2020/0342137 A1 * 10/2020 Barday ................. G06F 16/128
2021/0406398 A1 12/2021 Brannon et al.
2022/0092607 A1 * 3/2022 Jeske .................. G06F 11/3616
2022/0121777 A1 4/2022 Brannon et al.
2022/0147504 A1 * 5/2022 Chu .................... G06F 16/2282
2022/0261497 A1 8/2022 Barday et al.
2022/0277103 A1 9/2022 Brannon et al.
2023/0064816 A1 * 3/2023 Matsuoka ............. G06F 9/4881
(Continued)

*Primary Examiner* — Thuy N Nguyen
(74) *Attorney, Agent, or Firm* — Young Basile Hanlon & MacFarlane, P.C.

(57) ABSTRACT

An agent-based data operations system for data governance receives a data operation request in response to an event. The event is caused by at least one of a data subject request, an account termination, a user termination, or an expiration of a data retention period. In response to the data operation request data operations are performed across one or more data repositories. The data operations include at least one of a data deletion operation, a data retrieval operation, or a data modification operation. A performance of the data operations is monitored in real-time by a monitoring agent. A validation report including a timestamp of the execution status and an operational outcome of a respective data operation is updated automatically based on an execution status of at least one of the data operations and the validation report is output to a dashboard within a user interface.

20 Claims, 10 Drawing Sheets

(56) References Cited

U.S. PATENT DOCUMENTS

2023/0247140 A1* 8/2023 Li ........................ H04M 3/5232
379/266.01
2023/0280986 A1 9/2023 Taber et al.
2024/0070047 A1* 2/2024 Chatterjee ........... G06F 11/3433
2024/0241770 A1* 7/2024 Karve ...................... G06F 9/505
2024/0281419 A1* 8/2024 Alfaras ................. G06F 16/215
2025/0165296 A1* 5/2025 Hwang ................. G06F 9/5027
2025/0199838 A1* 6/2025 Billa ................... G06F 9/45558
2025/0203359 A1* 6/2025 Ghosh ................... H04L 9/3213
2025/0307428 A1* 10/2025 Khare ................... G06F 21/577
2025/0378001 A1* 12/2025 Fedoruk .............. G06F 21/6209
2025/0378386 A1* 12/2025 Fedoruk .............. G06F 21/6209

* cited by examiner

AGENT-BASED DATA OPERATION SYSTEM FOR DATA GOVERNANCE

FIELD

This disclosure generally relates to data governance systems, and, more specifically, to agent-based data operations for data governance, including data retention, deletion, and compliance monitoring through an execution pipeline.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
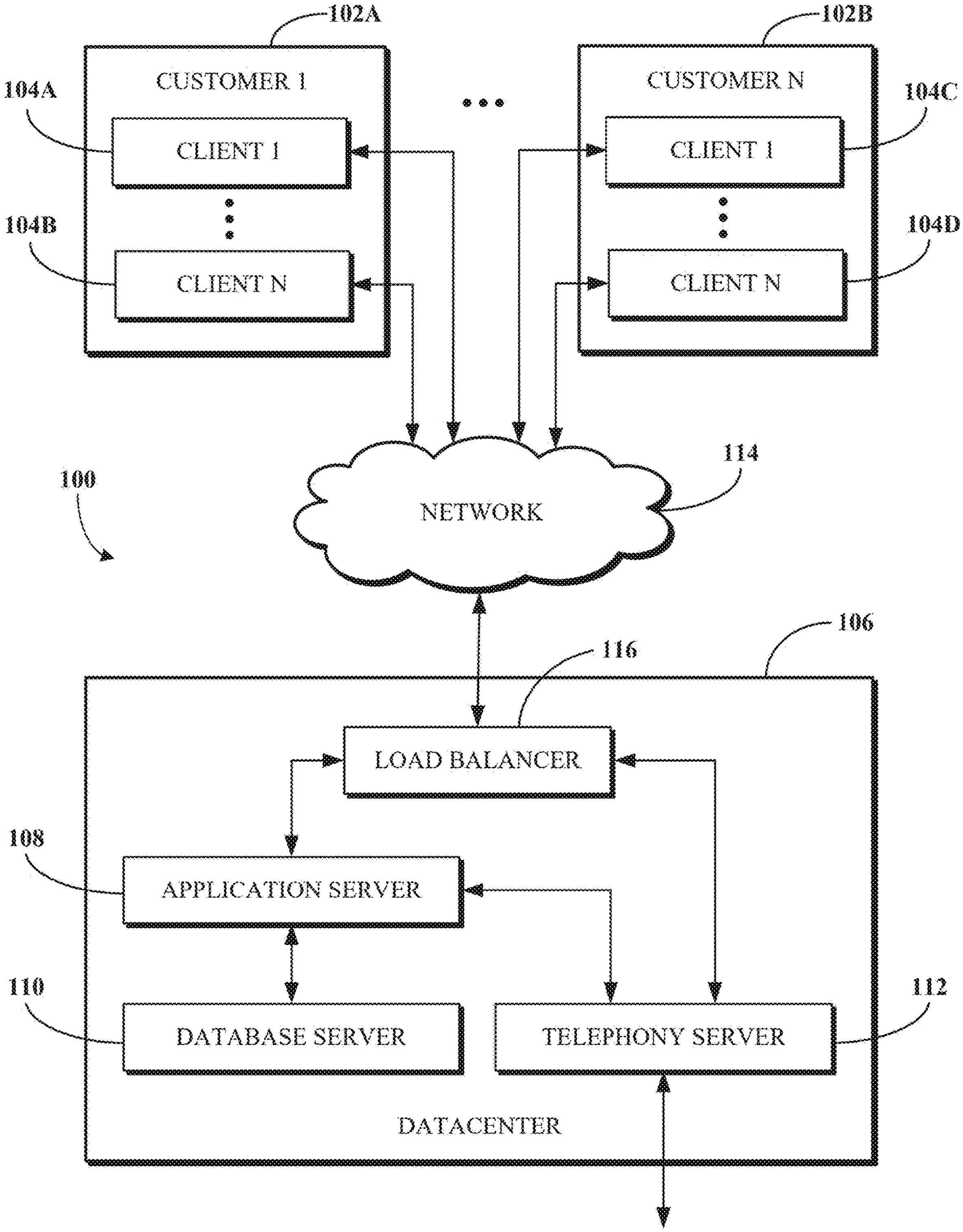
FIG. 1 is a block diagram of an example of an electronic computing and communications system.

Enterprise entities rely upon several modes of communication to support their operations, including video conferencing, telephone, email, internal messaging, productivity tools, and the like. These separate modes of communication have historically been implemented by service providers whose services are not integrated with one another. The disconnect between these services, in at least some cases, requires information to be manually passed by users from one service to the next. Furthermore, some services, such as telephony services, are traditionally delivered via on-premises solutions, meaning that remote workers and those who are generally increasingly mobile may be unable to rely upon them. One solution is by way of a unified communications as a service (UCaaS) platform or a contact center as a service (CCaaS), which include several communications services integrated over a network, such as the Internet, to deliver a complete communication experience regardless of physical location.

As enterprises increasingly rely on digital platforms, such as UCaaS or CCaaS platforms, to manage vast amounts of data, ensuring compliance with data retention policies, regulatory requirements, and user privacy requests has become a complex challenge. Regulations such as the General Data Protection Regulation (GDPR), the California Consumer Privacy Act (CCPA), and the Health Insurance Portability and Accountability Act (HIPAA) impose strict guidelines on how organizations must handle data deletion, access requests, and account terminations. Fulfilling these regulatory obligations requires platforms to accurately and completely execute data operations across multiple data repositories while fully maintaining consistency, security, and traceability in their data governance approaches. However, conventional approaches for managing data lifecycle operations often involve disparate systems and manual processes, leading to inefficiencies, delays, and an increased risk of non-compliance.

Furthermore, existing solutions for handling data retention and deletion requests such as described above frequently suffer from fragmentation, inefficiency, and a lack of scalability. For example, many enterprises rely on independent data governance tools that operate in silos, requiring administrators to manually coordinate deletion requests, verify data removal, and maintain compliance records across multiple platforms. This disjointed approach, which is due to technical system design, can result in operational bottlenecks, errors in data handling, and compliance risks due to incomplete or delayed execution of retention policies. Moreover, as enterprises grow and accumulate larger datasets across various services, conventional data governance approaches typically struggle to scale efficiently, making it increasingly difficult to process high-volume data operations in a timely manner.

Additionally, monitoring the execution of data operations in real-time presents another technical challenge for enterprises seeking to maintain compliance with regulations such as those described above. Conventional data governance systems typically lack automated validation mechanisms to track execution status, detect anomalies, and generate compliance reports without manual intervention. This limitation makes it difficult for enterprises to confirm whether data has been properly deleted, retained, or modified as required by regulatory frameworks. Furthermore, without a centralized execution pipeline, enterprises lack visibility into the status of data operations across multiple repositories, increasing the likelihood of operational inconsistencies and failures that go undetected. A centralized execution pipeline is a system architecture that consolidates the scheduling, execution, and monitoring of data operations within a unified framework. By centralizing control, enterprises can achieve greater visibility, consistency, and automation in managing data operations across multiple repositories, reducing the risk of inconsistencies, operational failures, and compliance violations. Ultimately, then, there are several significant shortcomings with modern computing systems that handle data governance via data operations which can be improved.

Implementations of this disclosure accordingly address problems such as those described above via a centralized an agent-based data operations system for data governance that automates the execution, monitoring, and validation of data operations across distributed data repositories. The system leverages a unified execution pipeline that processes data operation requests in response to regulatory, user-initiated, or policy-driven events. The execution pipeline dynamically orchestrates and prioritizes data operations, including data deletion, retrieval, and modification, while enabling compliance with data retention policies and legal and regulatory frameworks such as but not limited to the GDPR, the CCPA, or the HIPAA. The system further utilizes a real-time monitoring agent that continuously tracks the execution status of data operations, enabling automatic anomaly detection and validation reporting.

Implementations of this disclosure introduce an intelligent job scheduling mechanism that optimizes the processing of data operations based on factors such as data sensitivity classification, regulatory deadlines, and system performance constraints. The scheduling mechanism dynamically distributes data operations across multiple repositories for parallel execution (i.e., simultaneous execution), reducing bottlenecks and improving response times for high-volume requests. Additionally, the system incorporates an adaptive retry logic that intelligently modifies a retry parameter in response to failure conditions, such as a network disruption, a database lock error, or a timeout event. The retry parameter includes, but is not limited to, an increased wait interval for a subsequent retry, a change in an urgency level, an alternative execution path, or any combination thereof.

Implementation of this disclosure also provide an integrated dashboard that offers real-time visibility into ongoing and completed data operations. The dashboard aggregates execution status updates from the monitoring agent and presents validation reports including but not limited to timestamps, operational outcomes, and anomaly alerts. In the event an anomaly, such as an unexpected delay or an incomplete data deletion, is detected, the system automatically (i.e., without manual user intervention) generates an alert and initiates a remediation process. The dashboard further supports auditing capabilities by maintaining a traceable history of all executed data operations, allowing organizations to provide verifiable proof of compliance when required.

Implementations of this disclosure utilize a distributed execution framework that enables efficient handling of large-scale data operations. The framework employs a batch processing strategy that groups similar data operations together and executes them during non-peak hours, minimizing disruption to primary system functions. Additionally, the system incorporates multi-region deployment capabilities, allowing data operations to be executed across geographically distributed servers based on regional data residency requirements.

Implementations of this disclosure also integrate a hybrid verification model that combines automated validation checks with manual review options. The system performs automated integrity checks to confirm the completion of data operations and cross-references validation results with predefined compliance criteria. For operations requiring human oversight, the system provides an interface for manual verification, allowing compliance teams to review and approve critical actions such as data deletion requests subject to legal holds.

In some examples of the present disclosure, implementations may include or otherwise use one or more artificial intelligence or machine learning (collectively, AI/ML) systems having one or more models trained for one or more purposes. Use or inclusion of such AI/ML systems, such as for implementation of certain features or functions, may be turned off by default, where a user, an organization, or both must opt-in to utilize the features or functions that include or otherwise use an AI/ML system. User or organizational consent to use the AI/ML systems or features may be provided in one or more ways, for example, as explicit permission granted by a user prior to using an AI/ML feature, as administrative consent configured by administrator settings, or both. Users for whom such consent is obtained can be notified that they will be interacting with one or more AI/ML systems or features, for example, by an electronic message (e.g., delivered via a chat or email service or presented within a client application or webpage) or by an on-screen prompt, which can be applied on a per-interaction basis. Those users can also be provided with an easy way to withdraw their user consent, for example, using a form or like element provided within a client application, webpage, or on-screen prompt to allow individual users to opt-out of use of the AI/ML systems or features.

To enhance privacy and safety, as well as provide other benefits, the AI/ML processing system may be prevented from using a user's or organization's personal information (e.g., audio, video, chat, screen-sharing, attachments, or other communications-like content (such as poll results, whiteboards, or reactions)) to train any AI/ML models and instead only use the personal information for inference operations of the AI/ML processing system. Instead of using the personal information to train AI/ML models, AI/ML models may be trained using one or more commercially licensed data sets that do not contain the personal information of the user or organization.

To describe some implementations in greater detail, reference is first made to examples of hardware and software structures used to implement an agent-based data operations system for data governance. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an extensible markup language (XML) database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
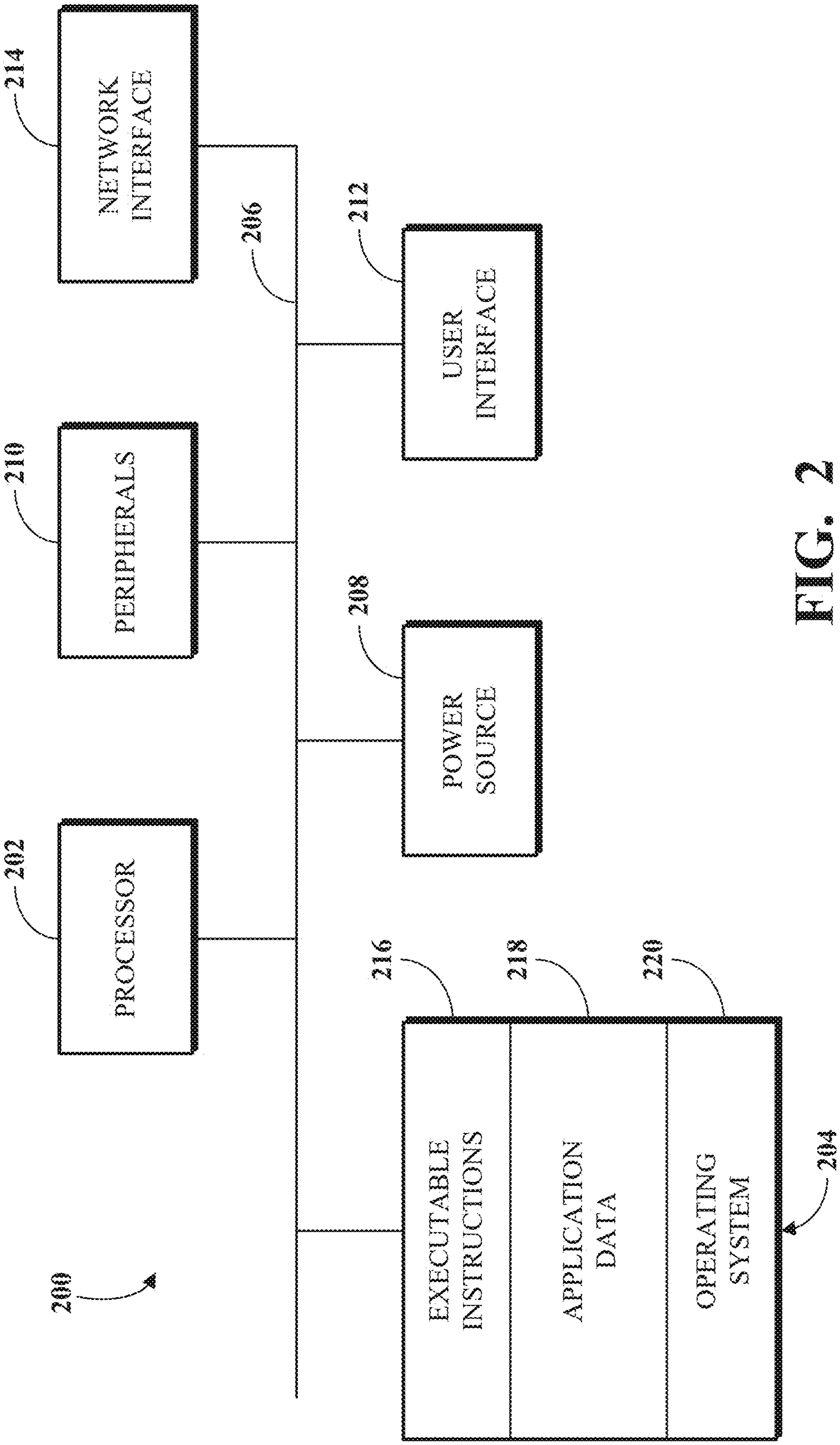
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as double data rate (DDR) SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an Institute of Electrical and Electronics Engineers (IEEE) 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
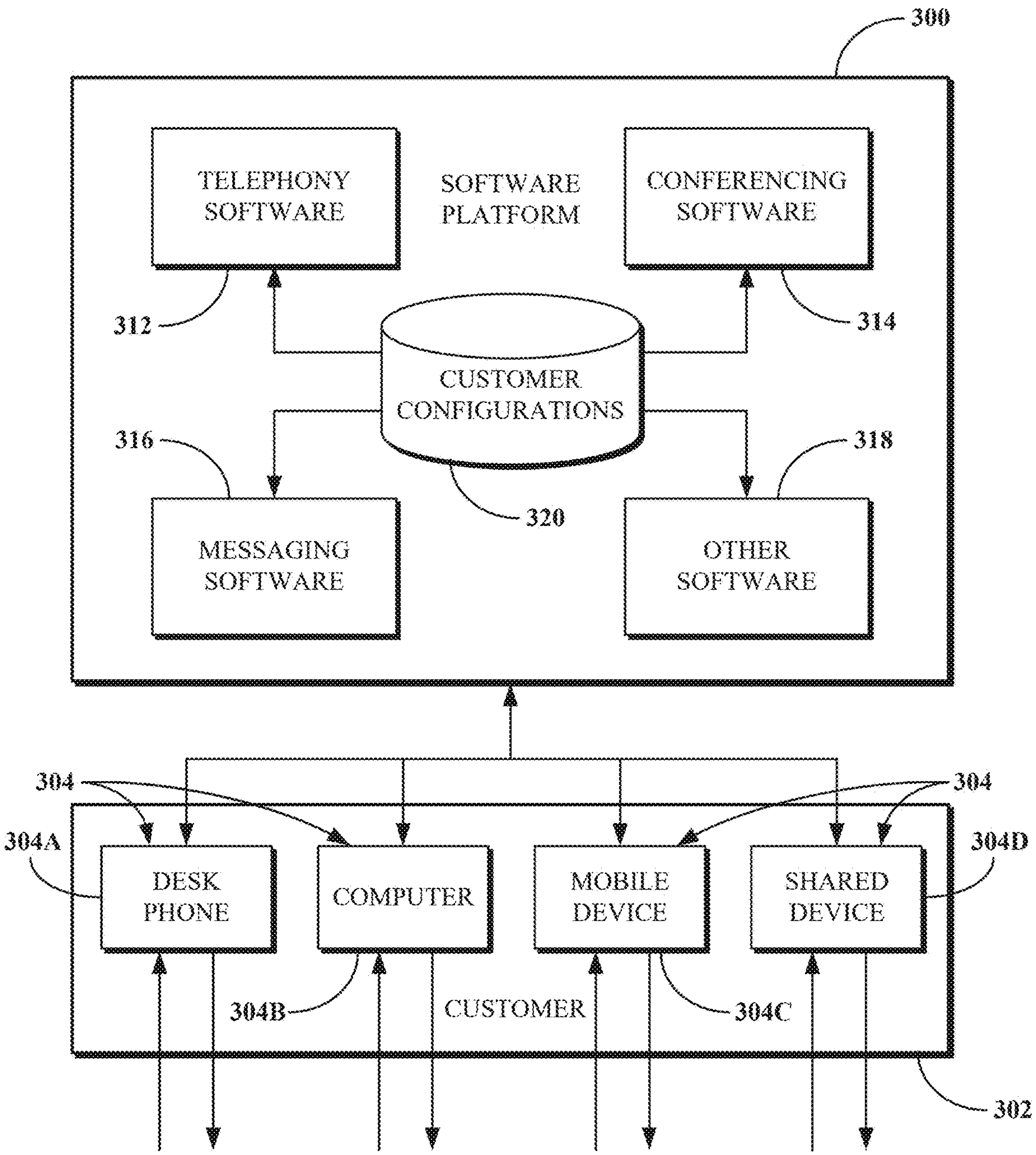
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304A, a computer 304B, a mobile device 304C, and a shared device 304D. The desk phone 304A is a desktop unit configured to at least send and receive calls and includes an input device for receiving a telephone number or extension to dial to and an output device for outputting audio and/or video for a call in progress. The computer 304B is a desktop, laptop, or tablet computer including an input device for receiving some form of user input and an output device for outputting information in an audio and/or visual format. The mobile device 304C is a smartphone, wearable device, or other mobile computing aspect including an input device for receiving some form of user input and an output device for outputting information in an audio and/or visual format. The desk phone 304A, the computer 304B, and the mobile device 304C may generally be considered personal devices configured for use by a single user. The shared device 304D is a desk phone, a computer, a mobile device, or a different device which may instead be configured for use by multiple specified or unspecified users.

Each of the clients 304 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 and other telephony-enabled devices, which may be other ones of the clients 304, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304A, a softphone running on the computer 304B, a mobile application running on the mobile device 304C, or using the shared device 304D that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include data governance software. The data governance software is configured to manage the lifecycle of data across distributed repositories by automating data retention, deletion, and compliance verification processes. The data governance software interacts with various system components, including an execution pipeline, a monitoring agent, and a dashboard, to orchestrate data operations, track execution status in real time, and generate validation reports to facilitate regulatory compliance.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304.

Figure 4:
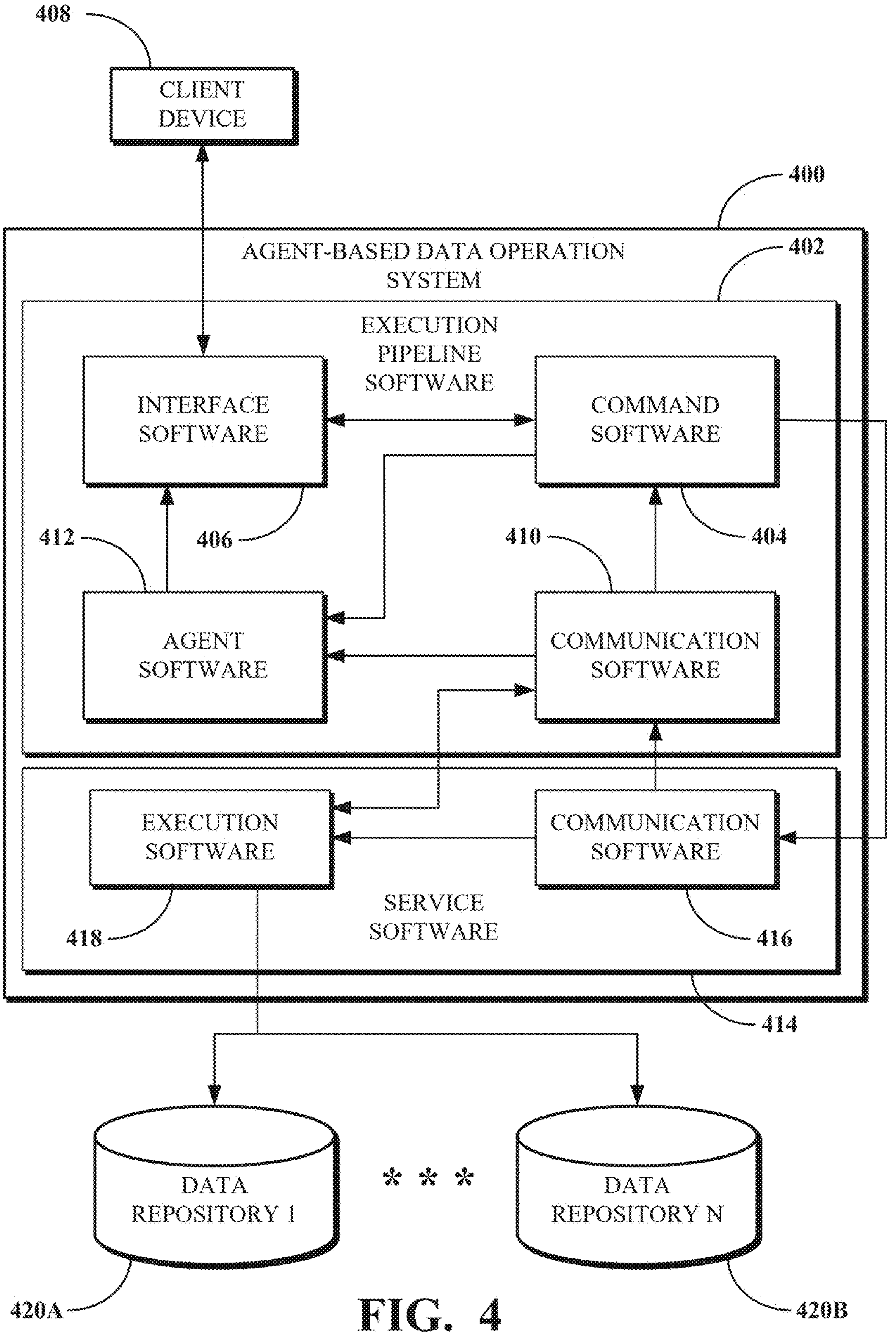
FIG. 4 is a block diagram of an example of an agent-based data operation system for data governance implemented in connection with a software platform.

FIG. 4 is a block diagram of an example of an agent-based data operation system 400 for data governance implemented in connection with a software platform, such as the software platform 300 of FIG. 3. The agent-based data operations system 400 facilitates the automated management of data operations, including data retention, deletion, and access requests, in accordance with predefined compliance-related policies and regulatory requirements. An execution pipeline software 402 coordinates the scheduling, prioritization, and execution of the data operations via command software 404. The command software 404 receives a data request via interface software 406 from a client device 408. The client device 408 includes, but is not limited to, a desktop computer, a mobile phone, a tablet computer, or the like. The client device may be or be similar to the clients 304 of FIG. 3. The interface software 406 can be a chat-based interface within a web application, a desktop application, a mobile client or the like. The interface software 406 can be a web application, a desktop application, a mobile application, or the like.

The command software 404 causes the data operations to be performed by scheduling the data operations with a service software 414. The service software 414 may be an individual service or application within the software platform. The service software 414 may be a collection of services or applications within the software platform. The command software 404 sends the data operations to the service software 414 via communication software 416. The communication software 416 is an interface for programmatically communicating with the service software 404. The communication software 416 can be an application programming interface (API) or a software development kit (SDK), or the like.

The programmatic communication, via the communication software 416, between the command software 404 and the service software 414 may be synchronous or asynchronous, depending on the nature of the operation. Synchronous communication means a mode of communication where a requestor sends a message and waits for an immediate response before proceeding, whereas asynchronous communication allows the requestor to continue execution without waiting for a response. The selection between synchronous and asynchronous communication may depend on system performance requirements, data consistency guarantees, fault tolerance needs, or the like. Synchronous processing allows for immediate feedback on operation success or failure, whereas asynchronous processing allows for non-blocking execution, reducing latency and improving scalability, especially in high-throughput environments. The communication software 416 of the service software 414 receives data operations from the command software 404 and sends the data operations to execution software 418 to be executed. The execution software 418 is software configured to interface with one or more data repositories, such as the data repositories 420A and 420B, to retrieve, modify, delete, or otherwise process data in accordance with the received data operation request.

The data repositories 420A and 420B may be relational databases, non-relational databases, distributed storage systems, and/or other types of data storage solutions used within the agent-based data operations system 400. The data repositories 420A and 420B store various types of structured and unstructured data, including, but not limited to, user records, logs, transactional data, metadata, and compliance-related records. Relational databases within the data repositories 420A and 420B may be structured using schemas that define tables, columns, and relationships between different data entities, facilitating complex queries and data integrity through the use of structured query language (SQL).

In contrast, non-relational databases, such as document stores, key-value stores, or column-family stores, allow for flexible data storage and retrieval, making them suitable for handling large-scale, semi-structured, or unstructured data. The execution software 418 interfaces with these data repositories to perform data operations such as data deletion, retrieval, or modification as directed by the command software 404. The execution software 418 may process data operations sequentially, in parallel (i.e., simultaneous), or based on a dynamically determined priority assigned by the command software 404. The priority can be defined by factors such as regulatory deadlines, resource availability, and system load balancing policies.

Additionally, the data repositories 420A and 420B may in some cases be distributed across multiple geographic regions to comply with data sovereignty regulations, enhance fault tolerance, and improve data availability. In some such implementations, the execution software 418 may coordinate data operations across multiple data storage nodes while maintaining consistency and synchronization in accordance with the predefined data governance policies. These policies, adhered to by the execution pipeline software 402, may define retention periods, access control measures, and compliance validation steps to facilitate regulatory adherence.

When the command software 404 sends the data operations to the service software 414, the command software 404 also assigns agent software 412 (i.e. a software-based monitoring agent) to monitor the execution of the data operations. The agent software 412 monitors the execution of the data operations through a combination of real-time data collection, communication protocols, analytical techniques and the like. The agent software 412 operates within the execution pipeline software 402 and is configured to track the execution of the data operations in real-time. Upon initiation, the agent software 412 monitors the progress of the execution software 418 and collects execution status updates. In some implementations, the agent software 412 logs the execution status updates (i.e., execution metrics, operational metrics). The logs include, but are not limited to, processing time, error rates, and system load. The log of the execution status updates may be used for performance analysis and optimization.

The agent software 412 receives real-time status updates from the execution software 418 via the communication software 410 of the execution pipeline software 402. The communication software 410 is an interface for programmatically communicating with the execution pipeline software 402 and the various components associated therewith. The communication software 410 can, for example, be an API, an SDK, or the like. The communication, via the communication software 410, between the execution software 418 and the agent software 412 may be synchronous or asynchronous, depending on the nature of the operation. The communication software 410 enables the agent software 412 to receive execution status updates and retrieve validation reports for real-time tracking and compliance verification. The communication software 410 facilitates bi-directional communication between the agent software 412 and the execution software 418, allowing the agent software 412 to detect anomalies, such as failed operations (i.e., a failed execution attempt), an unexpected delay beyond a threshold period (i.e., an unexpected processing delay), an inconsistent data validation result (i.e., an inconsistency in data integrity verification), a discrepancy in data processing, or an operational discrepancy.

In some implementations, the threshold period may be a dynamically determined threshold period, determined by the agent-based data operations system 400, based on real-time system conditions, historical execution data, and predictive analytics. The dynamically determined threshold period may be determined using an event-based trigger, the dynamically determined threshold period may be determined at a set interval (e.g., every 1 min, every 5 mins, every 15 mins, etc.), or an combination thereof. The agent-based data operations system 400 evaluates operational parameters such as system load, network latency, and historical completion times for similar data operations to establish an the dynamically determined threshold period. For example, if typical execution times for a specific operation range between 500 milliseconds and 1 second, the agent-based data operations system 400 may dynamically set the threshold period within this range based on factors such as current processing demand, available computational resources, and ongoing execution queue congestion. Additionally, the agent-based data operations system 400 may utilize one or more machine learning (ML) models to refine threshold determinations by identifying patterns in past execution failures or delays as described in more detail below. If the agent software 412 (i.e., a monitoring agent) detects that an execution delay exceeds the dynamically determined threshold, the agent-based data operations system 400 may classify the event as an irregularity and initiate a response. The response may include, but is not limited to, generating a real-time alert for system administrators, adjusting execution parameters such as allocating additional resources or reprioritizing the operation within the execution queue, and/or triggering a remediation process to correct the detected anomaly. Furthermore, the agent-based data operations system 400 may adaptively modify the dynamically determined threshold over time, incorporating newly observed execution trends to improve accuracy in detecting irregularities and optimizing operational efficiency.

In response to detecting an anomaly, the agent software 412 may generate an alert, log the event for auditing purposes, or trigger a corrective action (i.e., a corrective procedure), such as retrying a failed data operation, adjusting execution parameters, or escalating the issue for further review. The corrective action may be prioritized based on predefined rules, severity thresholds, or ML-based anomaly detection models that predict failure risks based on historical patterns. In cases where multiple anomalies or failures are detected across multiple data repositories, the execution pipeline software 402 can initiate a recovery process, including, but not limited to, reassigning failed operations to an alternative execution software, invoking backup processes, or triggering administrative review workflows.

In some implementations, the execution pipeline software 402 may dynamically evaluate failure conditions, such as, but not limited to, a network disruption, a database lock error, or a timeout event, and initiate failure recovery actions based on predefined policies or real-time load conditions. The execution pipeline software 402 evaluates failure conditions by monitoring execution logs, system health metrics, and error reports generated during the execution of data operations. For example, in cases where multiple execution failures occur across service software 414, the execution pipeline software 402 may trigger failover execution paths to minimize downtime. Additionally, the execution pipeline software 402 may invoke administrative workflows, such as policy escalation, to adjust processing thresholds dynamically.

In another example, if a high failure rate (i.e., failure frequency) is detected across multiple data repositories 420A and 420B, the execution pipeline software 402 may dynamically allocate additional computational resources or switch execution to a failover system. Similarly, if a data operation consistently encounters permission constraints, the system may trigger an automated policy review to adjust access control configurations.

The agent software 412 is configured to detect anomalies in the execution of data operations by utilizing a combination of real-time monitoring, predefined rule sets, statistical analysis, and machine learning-based predictive analytics. Upon assignment by the command software 404, the agent software 412 continuously tracks execution status updates from the execution software 418 via the communication software 410.

In some implementations, the agent software 412 utilizes predefined rule sets to identify common failures including, but not limited to, timeout thresholds, invalid operation responses, or transaction inconsistency checks. If an operation exceeds a predefined timeout threshold without completion, the agent software 412 can flag the operation as a potential failure or delay. If the execution software 418 returns an error code or invalid operation response, such as a database constraint violation, access denial, an integrity constraint failure, or the like, the agent software 412 logs the anomaly and can initiate a corrective action. Additionally, the agent software 412 verifies if a data operation modifies the expected number of records. For example, if a data deletion request is expected to remove one hundred records but only deletes fifty, the agent software 412 can flag the detected discrepancy.

In some implementations, in addition to rule-based detection, the agent software 412 performs statistical analysis based on historical execution data (e.g., based on historical execution times) to detect deviations from normal behavior. This includes, but is not limited to, spike detection, pattern recognition, and failure rate (i.e., failure frequency) monitoring. A sudden surge or spike in data deletion or access requests beyond a threshold (e.g., a 1000% increase in requests compared to baseline activity) may indicate an anomaly, such as a potential security breach, unintended bulk operations, or the like. For pattern recognition, the agent software 412 utilizes historical execution logs to identify unusual patterns, such as repeated failures for a specific data repository or service. Additionally, if the failure rate of data operations for the execution software 418 exceeds an acceptable threshold (e.g., 10% failure rate over the last 24 hours), the agent software 412 can generate an alert.

In some implementations, the agent software 412 may integrate ML models to predict potential failures before they occur. The ML models may analyze historical logs, execution performance metrics (i.e., benchmarks), and system load conditions to assess the likelihood of failure. The ML model can use regression analysis, anomaly scoring algorithms, categorization of failure types, or the like. For example, regression analysis can be used to estimate execution time deviations based on past operations or predefined system performance benchmarks. Anomaly scoring algorithms including, but not limited to, isolation forests or autoencoders, can be used to detect irregularities in execution behavior. Additionally, categorization of failure types can be used to allow the system to predict whether an operation is likely to fail due to infrastructure limitations, permission constraints, data inconsistencies, or the like.

The ML models used by the agent software 412 may be retrained using historical execution logs and system telemetry data. Adaptive learning techniques may be employed to refine the accuracy of anomaly detection by the ML model over time. Furthermore, a feedback loop mechanism may allow system administrators to provide corrective input, enabling supervised learning and improving future anomaly. The ML models utilized by the agent software 412 may periodically retrain on updated execution logs, incorporating new failure patterns and execution anomalies. A human-in-the-loop feedback mechanism may allow administrators to label detected anomalies, reinforcing the learning process and improving model precision over time. Additionally, a confidence threshold mechanism may be implemented to minimize false positives by adjusting detection sensitivity based on system load and operational variance.

In some implementations the ML models utilized by the agent software 412 may employ scheduled retraining cycles (e.g., daily, weekly, or dynamically triggered by anomalous patterns). The retraining process may involve adaptive learning techniques, such as, but not limited to, reinforcement learning, to fine-tune anomaly detection thresholds over time. Additionally, administrator feedback collected via a compliance dashboard (described below), which may be included as a part of the interface software 406, may be used for supervised learning to further refine model accuracy.

The agent software 412 also provides execution logs and validation reports that contain timestamps, operational outcomes, and compliance status indicators. These reports are stored and made available to the compliance dashboard. The compliance dashboard is a GUI that serves as a centralized control and monitoring system for overseeing data governance operations. The compliance dashboard is designed for users of the agent-based data operations system such as, but not limited to, administrators, compliance officers, or system operators. The compliance dashboard presents a structured and interactive environment for visualizing execution metrics, operational status, and compliance adherence. The compliance dashboard provides a centralized interface for reviewing a real-time execution status, historical logs, compliance validation reports, and real-time operational insights. The compliance dashboard enables users to filter and analyze data operation trends, drill down into individual execution logs for investigation, and configure alert thresholds for anomaly detection.

In some implementations the compliance dashboard provides role-based access control (RBAC) to limit access to compliance reports and operational logs to only authorized users of the agent-based data operations system 400. The compliance dashboard may include visual trend analysis tools, anomaly heatmaps, and historical failure rate (i.e. failure frequency) visualizations to assist administrators in proactively identifying potential compliance risks. The compliance dashboard may also facilitate the definition and maintenance of policy-based enforcement rules, allowing administrators to configure automated escalation workflows for detected anomalies.

Figure 5:
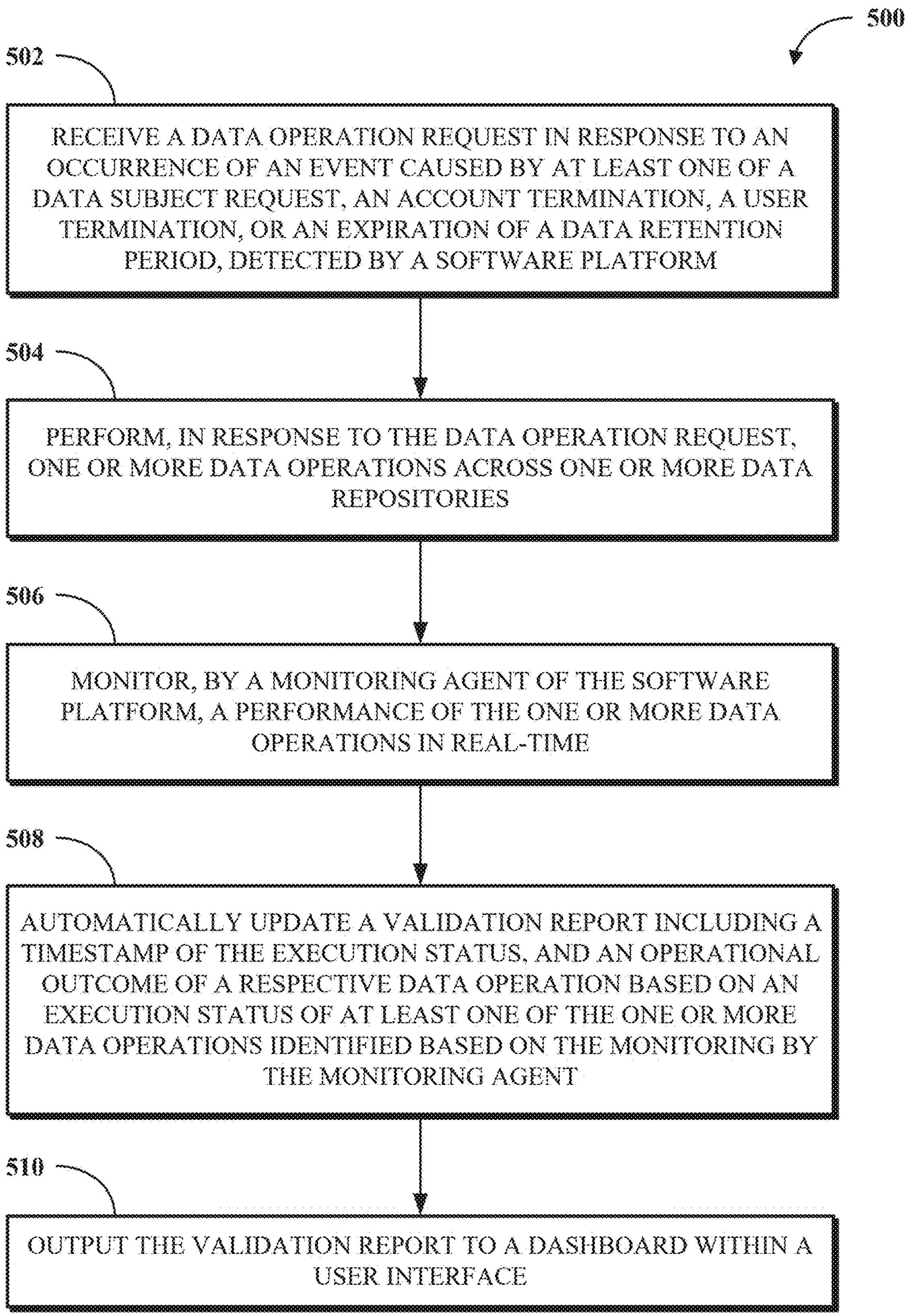
FIG. 5 is a flowchart of an example of a technique for performing and monitoring data operations within an agent-based data operation system for data governance.

To further describe some implementations in greater detail, reference is next made to examples of techniques which may be performed by or using an agent-based data operations system for data governance. FIG. 5 is a flowchart of an example of a technique 500 for performing and monitoring data operations within an agent-based data operation system for data governance. The technique 500 can be executed using computing devices, such as the systems, hardware, and software described with respect to FIGS. 1-4. The technique 500 can be performed, for example, by executing a machine-readable program or other computer-executable instructions, such as routines, instructions, programs, program instructions, or other code. The steps, or operations, of the technique 500, or another technique, method, process, or algorithm described in connection with the implementations disclosed herein can be implemented directly in hardware, firmware, software executed by hardware, circuitry, or a combination thereof.

For simplicity of explanation, the technique 500 is depicted and described herein as a series of steps or operations. However, the steps or operations of the technique 500 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 502, a data operation request is received in response to an occurrence of an event cause by at least one of a data subject request, an account termination, a user termination, or an expiration of a data retention period, detected by a software platform. The software platform may be or be similar to the software platform 300 of FIG. 3. The event causing the data operation request may be generated based on predefined policies, user actions, or automated compliance mechanisms within the software platform. The user actions may be performed using a client device, such as the client device 408 of FIG. 4.

In some implementations, the software platform continuously monitors system activity, user interactions, via client devices, and compliance requirements to detect events requiring data operations. The system may be or be similar to the agent-based data operations system 400 of FIG. 4. For example, a data subject request may correspond to a request submitted under legal or regulatory frameworks such as the GDPR, the CCPA or the HIPAA, requiring the deletion, modification, or retrieval of user data. Upon detection of a valid data subject request, the software platform may generate a data operation request to facilitate compliance with the applicable regulatory requirement.

In another example, an account termination event may be triggered when a user closes their account on the software platform, requiring the removal or archival of associated personal information, transaction history, and stored files. Similarly, a user termination event may occur in an enterprise environment when an employee or contractor is removed from the software platform, triggering the deletion or reassignment of access privileges, stored credentials, or associated records.

Additionally, an event may be detected due to the expiration of a data retention period as defined by the retention policies of the software platform. In such cases, the software platform evaluates stored records against predefined retention timelines and determines whether any data elements must be deleted, archived, or transferred to maintain compliance with data governance policies. The retention policies may be configured based on industry regulations, corporate governance standards, or jurisdictional legal requirements.

Upon detecting an event triggering a data operation request, the software platform automatically generates the request for processing by an execution pipeline, such as the execution pipeline software 402 of FIG. 4. The data operation request may specify one or more parameters, including, but not limited to, data identifiers, storage locations, operation types (e.g., deletion, retrieval, modification), execution priority levels, and compliance validation criteria.

In some implementations, the system may require multi-stage validation before executing the data operation request. For example, in response to a data subject request, the platform may verify the identity of the requestor, validate the authenticity of the request, and check that the requested operation does not conflict with other legal obligations, such as ongoing litigation holds or regulatory audits. In another example such as account terminations, the system may trigger confirmation workflows requiring explicit approval from administrators or compliance officers before proceeding with irreversible data operations.

At 504, one or more data operations are performed across one or more data repositories in response to the data operation request. That is, the request may be transmitted to command software, such as the command software 404 of FIG. 4, which schedules and orchestrates the execution of the requested operation. The command software coordinates the execution process by determining the appropriate execution path based on factors such as the type of data operation (e.g., deletion, modification, retrieval), the priority level of the request, system load conditions, and compliance requirements.

The command software transmits the data operation request to the appropriate service or application architecture, such as the service software 414 of FIG. 4, which is responsible for interacting with one or more data repositories, such as the data repositories 420A and 420B. The transmission may occur via a communication interface, such as the communication software 416, which provides an interface for programmatic communication between the command software and the service or application architecture as described above. The execution of data operations may be performed synchronously or asynchronously, depending on system requirements and operational constraints. For example, high-priority data deletion requests related to regulatory compliance can be executed immediately, while lower-priority operations, such as archival or data migration tasks, can be scheduled for off-peak processing to optimize system performance.

In some implementations, execution software, such as the execution software 418 of FIG. 4, manages the execution of data operations by interfacing directly with data repositories, such as the data repositories 420A and 420B of FIG. 4. The execution software may issue structured queries, transactional updates, or data retrieval commands, depending on the nature of the requested operation. In cases where multiple repositories are involved, the execution software can facilitate transactional integrity by coordinating distributed execution processes and maintaining data consistency.

For example, if the data operation request including a data deletion request is received for a user account, the execution software may identify all relevant records associated with the user across multiple repositories, including relational databases, document stores, and distributed storage systems. The execution software then issues delete operations to remove the associated metadata, logs, and linked records in compliance with a governance policy. Additionally, if retention policies require certain data elements to be anonymized, culled, or any combination thereof rather than deleted, the execution software may execute an obfuscation operation to replace identifying attributes with pseudonymous values.

In another example, if the data operation request includes a data retrieval request, such as a regulatory-mandated data access request, the execution software can query the appropriate repositories, retrieves the requested information, and compiles the results into a structured format. The retrieved data may be filtered based on access control policies such that only authorized information is returned to the requesting entity.

The execution pipeline checks that each data operation adheres to predefined security policies and regulatory requirements. In some implementations, before executing a requested operation, the execution pipeline may validate the operation against compliance rules, for example, verifying that the requested deletion aligns with a mandatory retention period (i.e., policy). If a conflict is detected, such as an attempt to delete data subject to a legal hold, the execution pipeline can reject the request or escalate it for further review.

At 506, a performance of the one or more data operations is monitored in real-time by a monitoring agent. The monitoring agent may be or be similar to the agent software 412 of FIG. 4 and is responsible for continuously tracking the execution status, performance metrics (i.e., benchmarks), and compliance adherence of the data operations across the one or more data repositories. The monitoring agent operates within the execution pipeline and receives execution status updates from the execution software via a communication interface such as the communication software 410 of FIG. 4.

The monitoring agent captures granular details about each data operation, including execution timestamps, transaction durations (i.e., processing durations, processing times), resource utilization, and success or failure status. The monitoring agent may track key performance indicators (KPIs), such as, but not limited to, query execution time, input/output (I/O) throughput, error rates, and system latency, to assess the efficiency of data processing operations. The captured performance data may be logged and used to generate real-time analytics, providing insights into system load, execution bottlenecks, and operational trends.

In some implementations, the monitoring agent utilizes event-driven tracking mechanisms to detect anomalies, failures, or deviations from expected performance baselines. For example, if an operation experiences excessive execution delay (i.e., unexpected processing delay), fails due to a data consistency violation, or exceeds predefined resource allocation limits, the monitoring agent can flag the issue and trigger an automated corrective action workflow. The corrective action may involve retrying the operation using a retry sequence, reassigning it to an alternate execution node, escalating the issue to an administrator, invoking failover mechanisms, or the like.

In some implementations, the monitoring agent leverages machine learning-based anomaly detection to identify deviations from normal execution patterns. Historical performance data is analyzed to establish a baseline for expected behavior, and outlier detection techniques such as, but not limited to, isolation forests, clustering algorithms, or regression models may be used to detect potential failures before they occur. If a pattern indicative of a failure emerges, such as a gradual increase in execution failures for a specific repository, the monitoring agent can preemptively trigger a mitigation strategy, such as redistributing processing loads or preemptively validating operation constraints.

At 508, a validation report including a timestamp of the execution status and an operational outcome of a respective data operation is automatically updated based on an execution status of at least one of the one or more data operations identified based on the monitoring by the monitoring agent. In other words, the monitoring agent continuously tracks the execution of the data operations performed by the execution software and dynamically generates a validation report reflecting real-time execution details. The validation report provides a structured record of operation outcomes, timestamps, system performance metrics (i.e., benchmarks), and compliance adherence indicators.

The validation report is updated each time a data operation reaches an execution milestone, such as initiation, completion, failure, retry, or manual intervention. Each update to the validation report may include metadata attributes, such as, but not limited to, a unique operation identifier, a timestamp, a status indicator, a cause of failure, execution performance metrics (i.e., benchmarks), compliance validation results. In some implementations, the monitoring agent can compile multiple validation reports across different data repositories to generate a comprehensive operational summary. For example, if a data deletion request is issued across the data repositories 420A and 420B, separate validation entries may be generated for each data repository, and the monitoring agent may aggregate the separate validation entries into a unified report.

In some implementations, the validation report includes event-driven status updates to reflect dynamic execution changes. For example, if an operation is flagged for retry due to a transient system failure, the validation report is updated with a retry timestamp and a reference to the previous failed attempt. If an operation requires manual approval, the validation report may be temporarily marked as "Pending Approval" until authorization is granted, at which point the report is updated with an approval timestamp and the identity of the approving entity.

In some implementations, the validation report is stored within a compliance audit repository, which may be queried via a compliance dashboard which may be implemented as a part of the interface software 406 of FIG. 4. The compliance dashboard enables authorized users to, view execution logs, analyze system trends, drill down into individual reports, configure compliance alerts, or the like.

Where a validation report reveals an execution anomaly, compliance risk, security concern, or the like, an automated escalation workflow may be initiated. For example, if an operation attempting to delete protected data is executed, the validation report may indicate a compliance breach, triggering an alert to an administrator or compliance officer for review. Similarly, if a high failure rate (i.e., failure frequency) is detected across multiple validation reports, the system may automatically increase monitoring sensitivity, allocate additional resources, or initiate failover recovery protocols.

At 510, the validation report is output to a dashboard within a user interface. That is, the system generates a structured validation report containing execution details and presents the report within a dashboard interface, such as the compliance dashboard. The dashboard provides a centralized view of the operational status of data operations executed across the system, allowing administrators, compliance officers, or other authorized users to monitor execution progress, investigate anomalies, and validate regulatory compliance.

In some implementations, the dashboard is configured to display validation reports dynamically, updating execution details in real-time as operations progress. Users may interact with the dashboard via filtering and sorting functionalities, enabling users to, for example, search for specific operations by request ID, execution timestamp, status or type of data operation. Additionally, users may filter reports based on compliance categories, failure causes, execution duration, or data repository location or drill down into detailed validation reports for a specific operation, reviewing timestamps, execution steps, and system logs.

In some implementations, the dashboard may support interactive visualizations to enhance the usability of validation reports. For example, the dashboard may support graphical charts that represent trends in data operation success rates, failure rates, and compliance adherence over time. In another example, the dashboard may support heatmaps that indicate frequent failure zones across multiple repositories, highlighting potential systemic issues. In another example, the dashboard may support anomaly detection overlays that flag data operations with unusually long execution times (i.e., processing times, processing durations) or unexpected retry attempts.

In some implementations, the dashboard can be integrated with RBAC to enforce security policies and verify that only authorized users can view or modify validation reports. For example, a compliance officer may be granted read-only access to all validation reports to audit system behavior, or a system administrator may have permissions to modify operational parameters or trigger corrective actions, or a data protection officer may be allowed to approve or reject policy overrides related to compliance-sensitive operations.

In some implementations, the validation report output to the dashboard may also trigger automated alerts and notifications based on predefined thresholds. For example, if a data operation failure rate exceeds a defined limit, the dashboard may issue an alert to system administrators. Alternatively, if a compliance violation is detected, such as an attempt to delete protected data, the system may flag the report for review. In another example, if an operation is delayed beyond expected execution time (i.e., processing duration, processing time), the dashboard may recommend investigating potential system bottlenecks.

In some implementations, the dashboard may include a historical log repository, allowing users to retrieve past validation reports for forensic analysis, compliance verification, or policy refinement. The historical log repository may also support data retention policies such that validation reports are stored securely for a predefined period in accordance with legal or regulatory requirements.

Figure 6:
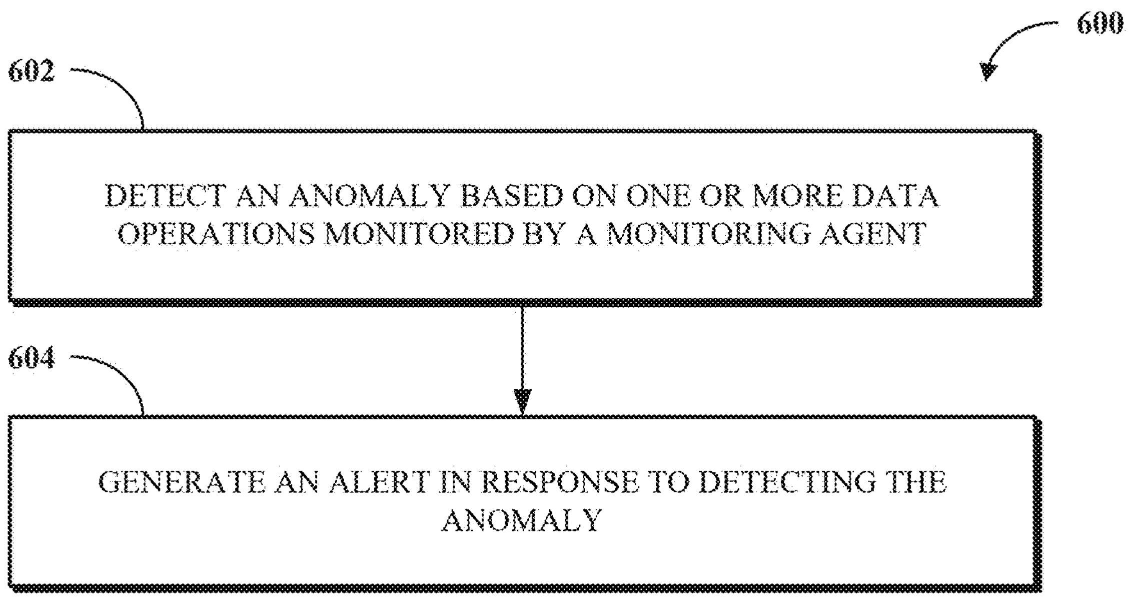
FIG. 6 is a flowchart of an example of a technique for anomaly detection within an agent-based data operation system for data governance.

FIG. 6 is a flowchart of an example of a technique 600 for anomaly detection within an agent-based data operation system for data governance. The technique 600 can be executed using computing devices, such as the systems, hardware, and software described with respect to FIGS. 1-4. The technique 600 can be performed, for example, by executing a machine-readable program or other computer-executable instructions, such as routines, instructions, programs, or other code. The steps, or operations, of the technique 600, or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations of the technique 600 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, an anomaly is detected based on one or more data operations monitored by a monitoring agent. The anomaly detection process is performed by the monitoring agent, which may be or be similar to the agent software 412 of FIG. 4. The monitoring agent continuously observes the execution of data operations across one or more data repositories to identify deviations from expected behavior. The anomaly detection process may be rule-based, statistical, or machine learning-driven or a combination thereof.

The monitoring agent applies predefined rule-based heuristics to detect operational failures, such as, but not limited to, timeout violations, where an operation exceeds a predefined execution time threshold, invalid transaction responses, including database constraint violations, permission denials, or checksum mismatches, or data integrity inconsistencies, where expected modifications (e.g., deletion of 100 records) do not match the actual modification count.

In some implementations, statistical anomaly detection may be employed to monitor system performance trends over time. The monitoring agent may analyze KPIs, such as query execution time, error rates, I/O throughput, and system latency, to identify patterns indicative of potential failures. For example, a sudden increase in failed operations beyond an expected baseline threshold may indicate a service degradation or a systemic issue within the execution pipeline.

In some implementations, the monitoring agent utilizes ML-based anomaly detection models trained on historical execution data. ML techniques, such as, but not limited to, regression analysis, clustering algorithms, isolation forests, or autoencoders, may be used to detect operational deviations. For example, regression analysis can predict execution time deviations based on historical operations. Alternatively, anomaly scoring models can assign risk scores to detected anomalies, filtering out false positives. In another example, pattern recognition techniques can flag unauthorized bulk operations indicative of insider threats or security breaches.

In addition to detecting operational anomalies, the monitoring agent may also detect compliance-related anomalies, such as, but not limited to, unauthorized data access where a user attempts to retrieve data outside their privilege scope, regulatory policy violations, such as premature deletion of records under a legal hold, or unusual bulk data modifications, which may indicate an unintended system misconfiguration or a potential security threat. For example, if a data deletion request originates from an unauthorized source or if an operation modifies data that is legally protected, the monitoring agent may flag the anomaly for further investigation. Compliance-related anomalies may trigger alerts that notify administrators or compliance officers for review and corrective action.

At 604, an alert is generated in response to detecting the anomaly. That is, once the anomaly is detected, the monitoring agent may generate an alert, log the event, or both for further processing. Data indicative of the alert may be transmitted to an administrative interface, such as a compliance dashboard within a user interface (i.e., the interface software 406 of FIG. 4) to cause the alert to be output to a client device, such as the client device 408 of FIG. 4. The compliance dashboard provides real-time visibility into detected anomalies, execution performance, and policy compliance. In some implementations, the monitoring agent may trigger an automated corrective action (i.e., corrective procedure), such as retrying the failed operation, reassigning the operation to a different execution node, or escalating the issue for manual intervention.

In some implementations, the alert may be categorized by severity level, allowing for prioritized responses. For instance, the alert may be categorized as an informational alert, such as a minor execution delay that does not affect the performance of the system. Additionally, the alert may be categorized as a warning-level alert indicating transient failures that may require manual intervention. Finally, the alert may be categorized as a critical alert, such as persistent system failures or detected security breaches, requiring immediate action.

The alert may be transmitted through multiple notification channels, including, but not limited to, email or short message system (SMS) notifications to designated compliance officers or system administrators, integration with security information and event management (SIEM) platforms for enterprise-wide monitoring, or a webhook-based messaging system for real-time incident response.

In some implementations, the monitoring agent may trigger an automated corrective action in response to detecting an anomaly (e.g., a failure condition). Corrective actions may include, but are not limited to, retrying the failed operation within a predefined number of attempts, retrying the failed operations with a dynamically adjusted number of attempts, reassigning the operation to an alternate execution node to balance system load, escalating the issue to an administrator when manual review is required, or an combination thereof.

In some instances, the detected anomaly may be part of a larger pattern of failures, in which case the monitoring agent may aggregate multiple anomalies into a single event report. For example, if multiple failures occur across different data repositories within a short time frame, the monitoring agent may correlate these anomalies and identify a systemic issue, such as a service outage or a misconfiguration affecting multiple operations.

Figure 7:
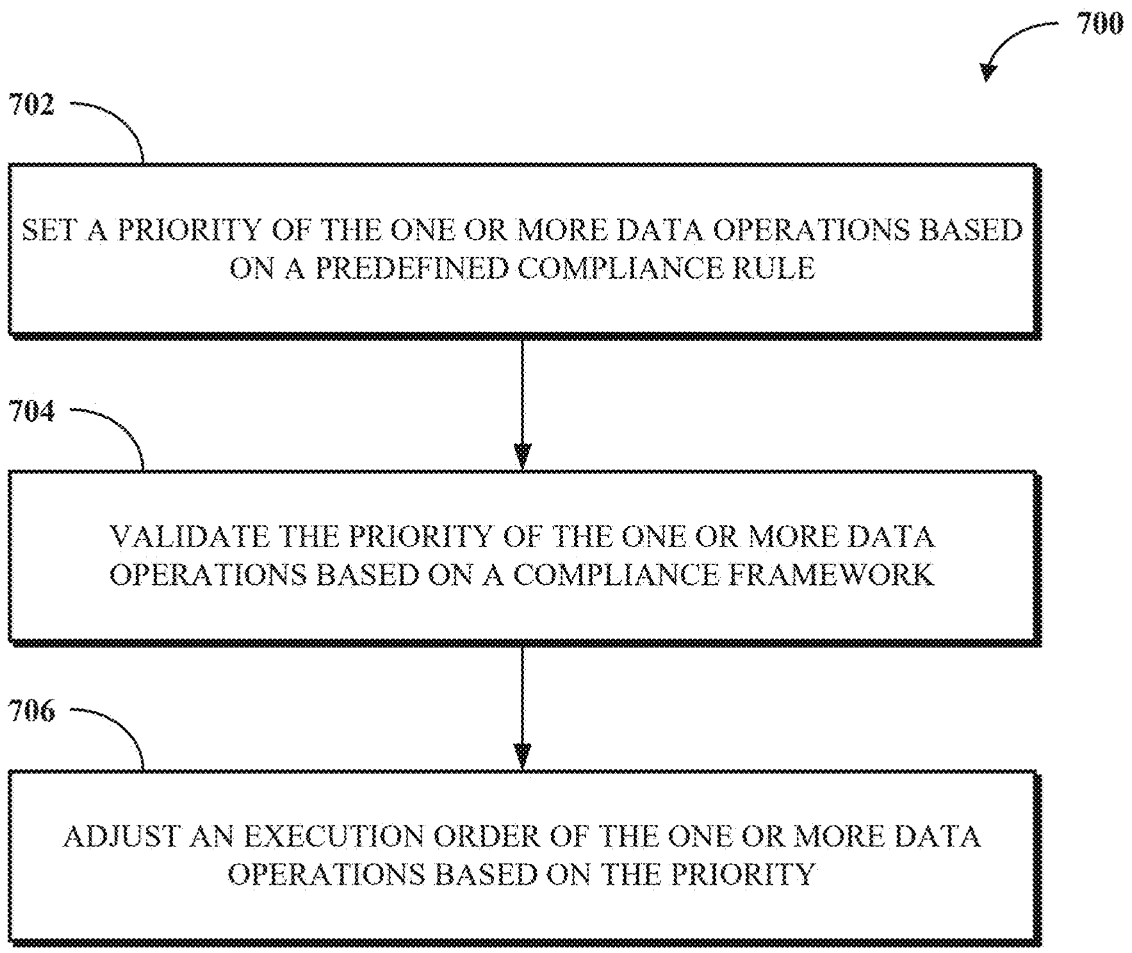
FIG. 7 is a flowchart of an example of a technique for setting a priority of a data operation within an agent-based data operation system for data governance.

FIG. 7 is a flowchart of an example of a technique 700 for setting a priority of a data operation within an agent-based data operation system for data governance. The technique 700 can be executed using computing devices, such as the systems, hardware, and software described with respect to FIGS. 1-4. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof.

For simplicity of explanation, the technique 700 is depicted and described herein as a series of steps or operations. However, the steps or operations of the technique 700 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 702, a priority of the one or more data operations is set based on a predefined compliance rule. That is, the system, such as the agent-based data operations system 400 of FIG. 4, evaluates the nature of the data operation request and assigns a priority level based on a predefined compliance (i.e., compliance-related) policy, a regulatory requirement, and operational urgency.

In some implementations, the predefined compliance-related policy (i.e., regulatory compliance timeframe) used to set priority levels may be based on various legal or regulatory frameworks, such as the GDPR, the CCPA, the HIPAA, or other jurisdiction-specific data governance mandates. For example, Data Subject Requests (DSRs), such as those under Article 17 ("Right to Erasure") of the GDPR, may be assigned a high priority to comply with statutory response time limits (e.g., within 30 days). In another example, Legal Hold Requests (LHR), which prevent data deletion due to ongoing litigation, may result in a low-priority assignment for deletion operations affecting legally retained records. In another example, Security Breach Mitigation Operations (SBMO), such as revoking compromised access credentials or quarantining affected data, may be assigned an immediate priority to prevent further exposure.

In some implementations, priority levels may be determined based on a combination of factors, including but not limited to, regulatory urgency, operational impact, a data sensitivity classification, resource constraints, or execution dependencies. Regulatory urgency may be determined based on whether the operation is subject to legal deadlines. Operational impact may be determined based on whether the operation affects mission-critical business processes. A data sensitivity classification maybe based on whether the operation involves access control updates or sensitive data remediation. Resource constraints may be based on whether the system is currently under high processing load. Execution dependencies may be based on whether the operation must be completed before other related tasks.

In some implementations, the priority levels may be classified into predefined categories, including but not limited to immediate (i.e. critical), high priority, normal priority, or low priority (i.e. deferred). The immediate category is used for operations that must be executed without delay due to security concerns, regulatory obligations, or system integrity risks, for example, security breach responses, urgent data deletion requests under GDPR. The high priority category is used for operations requiring expedited processing due to compliance deadlines or user requests for instance, access control modifications, regulatory-mandated data retrieval requests. The normal priority category is for routine data operations that do not require immediate action but must be processed within standard execution timeframes for instance, non-urgent archival, metadata update. The low priority category is for non-urgent operations that can be scheduled for execution during off-peak hours to optimize system performance for instance, bulk anonymization, non-time-sensitive data migration.

In some implementations, the system dynamically adjusts priority levels in response to real-time conditions. For example, if system load is high, the system may defer low-priority operations to free up resources for high-priority requests. In another example, if a regulatory deadline is approaching, the system may elevate the priority of pending compliance-related operations. In another example, if an operation fails and requires a retry, the system may escalate its priority to prevent excessive delays.

In some implementations, priority settings may be overridden based on administrative policies. For example, a compliance officer may manually escalate the priority of a pending data operation if deemed legally necessary. In another example, a system administrator may downgrade the priority of a resource-intensive operation to prevent system overload.

The assigned priority level may be included within the data operation request and used by command software, such as the command software 404 of FIG. 4, to schedule execution within an execution pipeline, such as the execution pipeline software 402 of FIG. 4. The execution pipeline evaluates the assigned priority and determines the optimal execution path based on system availability, execution dependencies, and compliance requirements. In some implementations, the execution pipeline is configured to dynamically reorder an execution sequence of the one or more data operations based on the processing priority. That is, as new data operation requests are received or system conditions change, the execution pipeline may reprioritize pending operations to ensure that high-priority tasks, such as compliance-mandated data deletions or time-sensitive retrieval requests, are executed with minimal delay. The reordering may be performed using scheduling algorithms that consider factors such as, but not limited to, real-time resource utilization, operation deadlines, and interdependencies between data operations. For example, if a lower-priority operation is in progress but a critical, high-priority deletion request is received, the execution pipeline may suspend or delay the lower-priority task to expedite the execution of the high-priority request.

At 704, a priority of the one or more data operations is validated based on a compliance framework. That is, before executing a data operation, the system validates that the assigned priority level aligns with regulatory mandates, internal governance policies, and operational risk considerations. The validation process may involve evaluating factors such as statutory deadlines, legal hold requirements, and industry-specific compliance rules. For example, if a data deletion request is marked as high-priority, the system verifies that it is legally mandated (e.g., a GDPR "Right to Erasure" request) before confirming the priority. In another example, if a data modification request involves records subject to a legal hold, the system may override a previously assigned priority level and downgrade the request to prevent unauthorized modifications. The priority validation process ensures that compliance-sensitive operations are executed in a manner consistent with legal and regulatory obligations.

At 706, an execution order of the one or more data operations is adjusted based on the priority. That is, once the priority of each data operation is confirmed, the execution pipeline, evaluates pending operations and determines an optimal execution sequence. The system may reprioritize operations in response to changing conditions, such as approaching regulatory deadlines, increased system workload, or newly detected security threats. For example, if multiple data operations are queued for execution, but a high-priority data retention request must be processed to maintain compliance with a regulatory framework, the system may elevate its execution position ahead of lower-priority tasks. In another example, if a low-priority operation is already in progress but a LHR is received, the system may suspend or defer the ongoing task to prioritize the compliance-sensitive operation.

Figure 8:
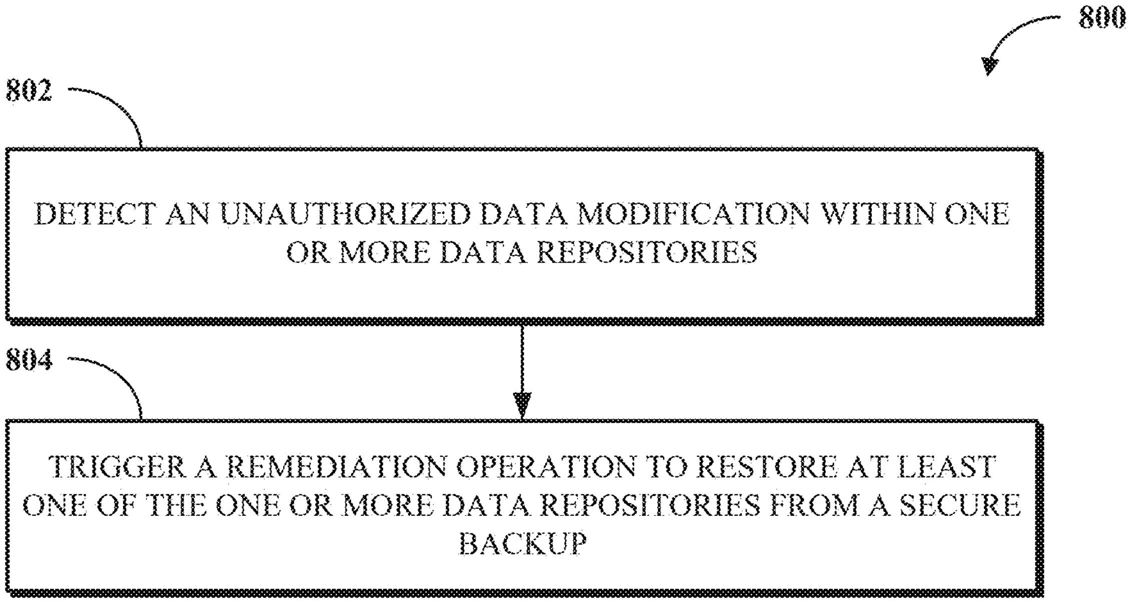
FIG. 8 is a flowchart of an example of a technique for detecting unauthorized data modifications within an agent-based data operation system for data governance.

FIG. 8 is a flowchart of an example of a technique 800 for detecting unauthorized data modifications (i.e., unauthorized alteration) within an agent-based data operation system for data governance. The technique 800 can be executed using computing devices, such as the systems, hardware, and software described with respect to FIGS. 1-4. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

For simplicity of explanation, the technique 800 is depicted and described herein as a series of steps or operations. However, the steps or operations of the technique 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 802, an unauthorized data modification is detected within one or more data repositories. The detection mechanism uses real-time monitoring, access control enforcement, audit logging, and anomaly detection algorithms within a data governance system (i.e., system), such as the agent-based data operations system 400 of FIG. 4. The system utilizes a combination of rule-based detection, cryptographic integrity verification, and ML driven anomaly detection to identify unauthorized modifications and mitigate security risks. The system utilizes a monitoring agent, such as the agent software 412 of FIG. 4, to continuously track data operations occurring within the one or more data repositories, such as the data repositories 420A and 420B of FIG. 4. The monitoring agent performs event-driven tracking and captures data modifications, including, but not limited to, data updates, data insertions, data deletions, and schema changes. Each data modification event is logged along with metadata attributes, including but not limited to, timestamp of the modification, user identity or system process initiating the change, source IP address or device information, affected data fields and repository location, change type (e.g., update, insert, delete, schema modification), access control validation status (e.g., permitted vs. unauthorized).

Unauthorized modifications are detected when a data operation violates an access control policy. The system enforces RBAC, attribute-based access controls (ABAC), or both to limit data modification privileges. The system identifies unauthorized modifications through, but not limited to, privilege violations, compliance-related policy violations, modification outside authorized time windows, or unauthorized modification from external systems. A privilege violation occurs when a user or process attempts to modify restricted data without the necessary access permissions, an unauthorized user modifies sensitive data records (e.g., customer personally identifiable information (PII), financial transactions, medical records, a temporary system account or external API key performs an unexpected modification, or the like).

Compliance-related policy violations occur when a data modification violates regulatory compliance requirements (e.g., GDPR, CCPA, HIPAA), a data retention policy mandates that certain records cannot be altered after a specified time (e.g., tamper-proof audit logs), but an update is attempted, a legal hold is placed on specific records due to ongoing litigation, yet modifications are detected, or the like. Modification outside authorized time window violations occur when the system detects an unauthorized after-hours data modification outside normal business hours, or modifications occur outside a pre-approved maintenance window without administrator approval, or the like. Unauthorized Modifications from External Systems occur when the system detects an attempt to modify records from an unregistered external application, a third-party API key performs unauthorized updates outside the scope of permitted integrations, or the like.

When any of the above conditions are met, the system flags the modification as unauthorized and logs the incident for further review. While the above conditions are provided for demonstrative purposes, they are not an exhaustive list, other conditions may be used to identify unauthorized modifications.

In some implementations, the system utilizes cryptographic hashing to detect unauthorized changes to sensitive records. Each record is associated with a cryptographic hash at the time of creation or last authorized modification. When a record is created, a hash value (e.g., secure harsh algorithm (SHA)-256 or hash-based message authentication code (HMAC)) is computed based on the record contents. When a modification is detected, the system recomputes the hash and compares it to the previously stored hash. If the new hash matches the expected hash, the modification is valid. If the hashes do not match, an unauthorized change has been detected. If a discrepancy is found, the system triggers real-time anomaly detection workflows and notifies system administrators.

In some implementations, the monitoring agent may incorporate ML models to detect suspicious data modifications that deviate from historical patterns. The ML models analyze past modification activity and identify anomalies using techniques such as, but not limited to, behavioral analysis, outlier detection, time-series analysis. Behavioral analysis identifies if a user or system suddenly modifies large volumes of data, deviating from normal patterns, or detects modifications occurring from an unusual geographic location or device. Outlier detection uses techniques such as isolation forests or autoencoders to flag abnormal data modification requests. Time-series analysis analyzes historical trends and detects spikes in modification frequency. For example, if an admin account that typically modifies ten records per week suddenly modifies fifty thousand records in an hour, the ML model flags this as potentially unauthorized.

At 804, a remediation operation to restore at least one of the one or more data repositories from a secure backup is triggered. The remediation is triggered in response to the detection of an unauthorized data modification, data corruption, system failure, or the like. The remediation process is executed by the data governance system and may be performed using automated rollback mechanisms, versioned backups, distributed recovery protocols or the like.

A remediation operation is triggered under various circumstances, including but not limited to, unauthorized data modifications, data corruption or integrity failures, system outages or failures, compliance (i.e., compliance-related) policy violations, or ransomware or cybersecurity incidents. Unauthorized data modifications are detected by the monitoring agent due to unauthorized access, privilege escalation, or malicious tampering as described above. Data corruption or integrity failures are detected through cryptographic integrity checks, hash mismatches, or checksum failures as described above. In the event of system outages or failures restoration may be needed due to hardware failures, database crashes, power losses, or software bugs affecting the data repositories. If regulatory frameworks (e.g., GDPR, CCPA, HIPAA) require restoration due to unauthorized deletions or modifications, an automated remediation operation is initiated based on compliance-related policy violations. In the event of ransomware or cybersecurity incidents if a data repository is compromised, the system can restore a pre-attack state (i.e., previous state) to neutralize the threat. Upon detecting any of the above conditions, the system can automatically trigger a remediation workflow to restore the data repositories from a secure backup.

In some implementations, the remediation operation involves restoring affecting data repositories from a secure backup location in a backup system. The backup system may include multiple backup types and storage locations. The backup system can maintain multiple backup strategies such as, but not limited to, full backups, incremental backups, differential backup, or snapshot-based backup. Additionally, the backup system may utilize multiple backup locations including, but not limited to, one-premises storage (e.g., local enterprise backup servers), cloud-base storage, distributed storage networks (e.g., decentralized backup system), or any combination thereof. Furthermore, each backup can be cryptographically signed and timestamped to verify authenticity and prevent tampering.

In some implementations, when a remediation operation is triggered, the system retrieves backup metadata to identify the latest valid, uncorrupted, and compliant backup version form the backup system, iterating through versioned backups if necessary to locate the last trusted backup. The backup system then verifies the integrity of the selected backup using hash values, digital signatures, cryptographic checksums, or any combination thereof, flagging any inconsistencies and selecting an alternate version if required. The restoration process can vary based on the extent of the data compromise, enabling granular recovery of individual records, table-level or schema restoration, full database rollback, or cross-repository synchronization to maintain consistency across distributed storage systems.

After completing the restoration, the backup system conducts post-restoration integrity checks to verify data validity and compliance with governance policies. The backup system recalculates cryptographic hashes to verify data consistency, reconciles transactions to maintain database integrity, and confirms that access control policies remain enforced. All restoration activities are logged within an audit trail for regulatory compliance, and compliance dashboards generate summaries for security and legal review. In some implementations, compliance officers may be notified to validate the restoration and verify adherence to applicable regulatory frameworks.

Figure 9:
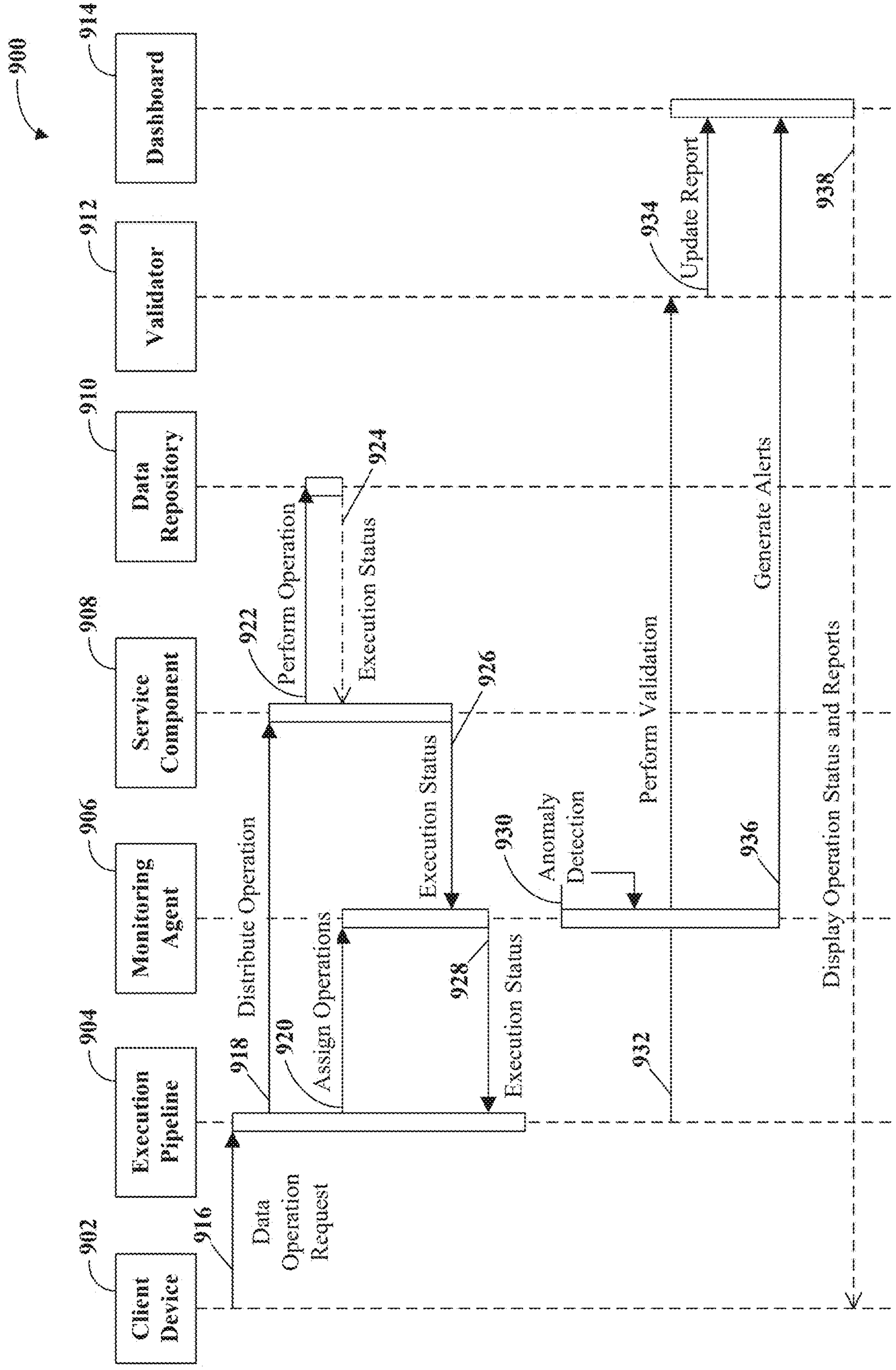
FIG. 9 is an example of an interaction diagram of data governance operations performed within a software platform.

FIG. 9 is an example of an interaction diagram of data governance operations 900 performed within a software platform. The software platform may be or be similar to the software platform 300 of FIG. 3. The data governance operations 900 are initiated in response to a client device 902 sending a data operation request 916 to an execution pipeline 904. The client device 902 may be or be similar to the client device 408 of FIG. 4. The execution pipeline 904 may be or be similar to the execution pipeline software 402 of FIG. 4. The data operation request may be or be similar to the data operation request as described in reference to step 502 of FIG. 5.

At 918, the execution pipeline 904 distributes the data operation associated with the data operation request to a service component 908. The service component 908 may be or be similar to the service software 414 of FIG. 4. The data operation may be distributed in a manner consistent with step 504 of FIG. 5. Once the data operation has been distributed to the service component 908, the execution pipeline 904 assigns the data operation to a monitoring agent 906 for monitoring at the client device 902. The monitoring agent may be the same or similar to the agent software 412 of FIG. 4. The monitoring agent 906 may be assigned the data operation using an event driven notification process such as, but not limited to, message queues, Pub-Sub model, or direct API calls. For the message queues model, the data operation is pushed to a queue that the monitoring agent 906 is subscribed to. The monitoring agent 906 is then able to retrieve assigned data operation from the queue. For the Pub-Sub method, the execution pipeline 904 publishes the data operation events to a topic (e.g., "DeleteOperations", "ModificationOperations", etc.) and the monitoring agent 906 subscribes to the relevant topics to receive updates in real-time. Using direct API calls, the execution pipeline 904 sends a hyper-text transfer protocol (HTTP) request or remote procedure call (RCP) to an endpoint exposed by the monitoring agent 906, notifying the monitoring agent 906 of a new data operation assignment. The notification message typically includes, but is not limited to, operation identifier, execution start timestamp, target service component handling the operation, expected execution time threshold, compliance rules applicable to the operation, retry policies in case of failure.

At 922, the service component 908 performs the data operation against a data repository 910. The data repository 910 may be or be similar to the data repositories 420A and 420B of FIG. 4. At 924, the execution status of the data operation is sent back to the service component 908 by the data repository 910. The service component 908 then reports the execution status back to the monitoring agent 906 at 926. At 928, the monitoring agent 906 then reports the execution state back to the execution pipeline 904. At 930, after the monitoring agent 906 receives the execution status of the data operation, the monitoring agent begins anomaly detection. Anomaly detection is an iterative process that is constantly being run and updated with each newly received execution status. The anomaly detection process may be or be similar to the process describes above in reference to step 506 of FIG. 5.

At 932, the execution pipeline 904 initiates a validation request to the validator 912 to validate the data operation. The validation request may be transmitted via, API-based communication, message queue systems, event-driven notification, or the like. The validation request includes parameters such as, but not limited to, operation identifier, operation type, target data repository, user identity and access control, execution priority and scheduling constraints, and compliance requirements. The validator 912 performs a validation check to confirm that the operation was executed correctly and that the intended modifications, deletions, or updates have been successfully applied to the data repository 910. The validator 912 operates as part of the execution pipeline 904, to verify that data integrity is maintained and that operations meet compliance and governance requirements.

To validate the data operation, the validator 912 retrieves execution logs, status reports, and data snapshots from the service component 908 and cross-references them against the original operation request. In the case of a data deletion operation, the validator 912 confirms that the specified records have been removed from the data repository 910. This may involve issuing queries to verify that no remnants of the deleted data persist within the system. If the operation involved a modification or update, the validator 912 checks that the affected records reflect the intended changes and that no unintended alterations occurred. Similarly, for a data retrieval request, the validator 912 verifies that the correct data was returned and that the operation did not introduce inconsistencies.

The validator 912 employs multiple verification mechanisms to ensure the accuracy of the operation. This may include record count verification, where the validator 912 compares the expected number of affected records against the actual number processed. For delete operations, the validator 912 checks whether the targeted records have been removed. For update operations, the validator 912 checks that the modified records match the expected values. In some implementations, cryptographic hash validation may be performed by computing a checksum of the relevant data before and after the operation to detect discrepancies.

In some implementations, the validator 912 utilizes transaction consistency checks to verify that the data operation did not disrupt referential integrity or leave orphaned records. For example, if a deletion request involves cascading constraints, the validator 912 checks that all dependent records have been correctly removed. If a rollback mechanism is available, the validator 912 may cross-check the impact of the operation against pre-operation snapshots to confirm data consistency.

If the validator 912 determines that the data operation was unsuccessful or partially completed, it may trigger an error-handling workflow within the execution pipeline 904. This may include, but is not limited to, retrying the operation, initiating a rollback, or escalating the issue for manual intervention.

At 934, the validator 912 generates a validation report that serves as a record of the execution status of the data operation. The validation report includes execution timestamps indicating when the operation was initiated and completed, providing a chronological log for auditing and troubleshooting purposes. Additionally, the report contains success or failure indicators that reflect whether the data operation was executed as expected, allowing administrators or compliance officers to quickly assess the outcome. If the operation was successful, the report confirms that the requested modifications, deletions, or updates were fully implemented. If the operation failed or was only partially completed, the report details the specific failure reasons, such as permission issues, data integrity constraints, or system errors. Furthermore, the validation report includes compliance verification results that assess whether the operation adheres to a predefined regulatory policy, such as, but not limited to, a mandatory retention period (i.e., mandatory data retention directive), a legal deadline, a legal hold, a regulatory compliance timeframe, or an audit logging requirement. Once generated, the validation report is transmitted to the dashboard 914, which is presented via a user interface, such as the interface software 406 of FIG. 4.

At 936, the monitoring agent 906 generates an alert in response to detecting an anomaly in the execution of the data operation. The monitoring agent 906 continuously tracks the progress and results of data operations within the execution pipeline, as described above. Upon detecting an anomaly, the monitoring agent 906 classifies the issue based on predefined severity levels, such as, but not limited to, minor discrepancies, potential compliance violations, or system failures. The alert may include details such as the operation identifier, affected data repository, execution timestamps, the nature of the anomaly, and relevant error codes. The alert is then transmitted to the dashboard 914, where stakeholders, such as system administrators, compliance officers, or automated remediation workflows can be notified. In some implementations, the monitoring agent 906 may also trigger a corrective action (i.e., corrective procedure) such as retrying failed operations, escalating issues for manual review, or temporarily pausing high-risk operations to prevent further data inconsistencies.

At 938, the operation status and reports are displayed to the client device 902 via the dashboard 914. The dashboard 914, presented through a user interface such as the interface software 406 of FIG. 4, provides a centralized view of real-time execution metrics, validation reports, real-time operational insights (e.g., at least one real-time operational insight), and system alerts related to data operations. The displayed information includes, but is not limited to, execution timestamps, operation success or failure indicators, compliance verification results, and any detected anomalies or discrepancies flagged by the monitoring agent 906. The client device 902, which may be a desktop computer, mobile device, or web-based interface, enables administrators, compliance officers, and other authorized users to review operation details, assess compliance adherence, and take corrective actions if necessary. In some implementations, the dashboard 914 supports interactive features such as filtering reports by execution status, sorting data operations by priority, and drilling down into individual operation logs to examine detailed validation records. In some implementation, the dashboard 914 may include graphical representations such as trend analysis charts, heatmaps highlighting recurring issues, or anomaly detection overlays to assist users in identifying potential risks and optimizing data governance policies.

Figure 10:
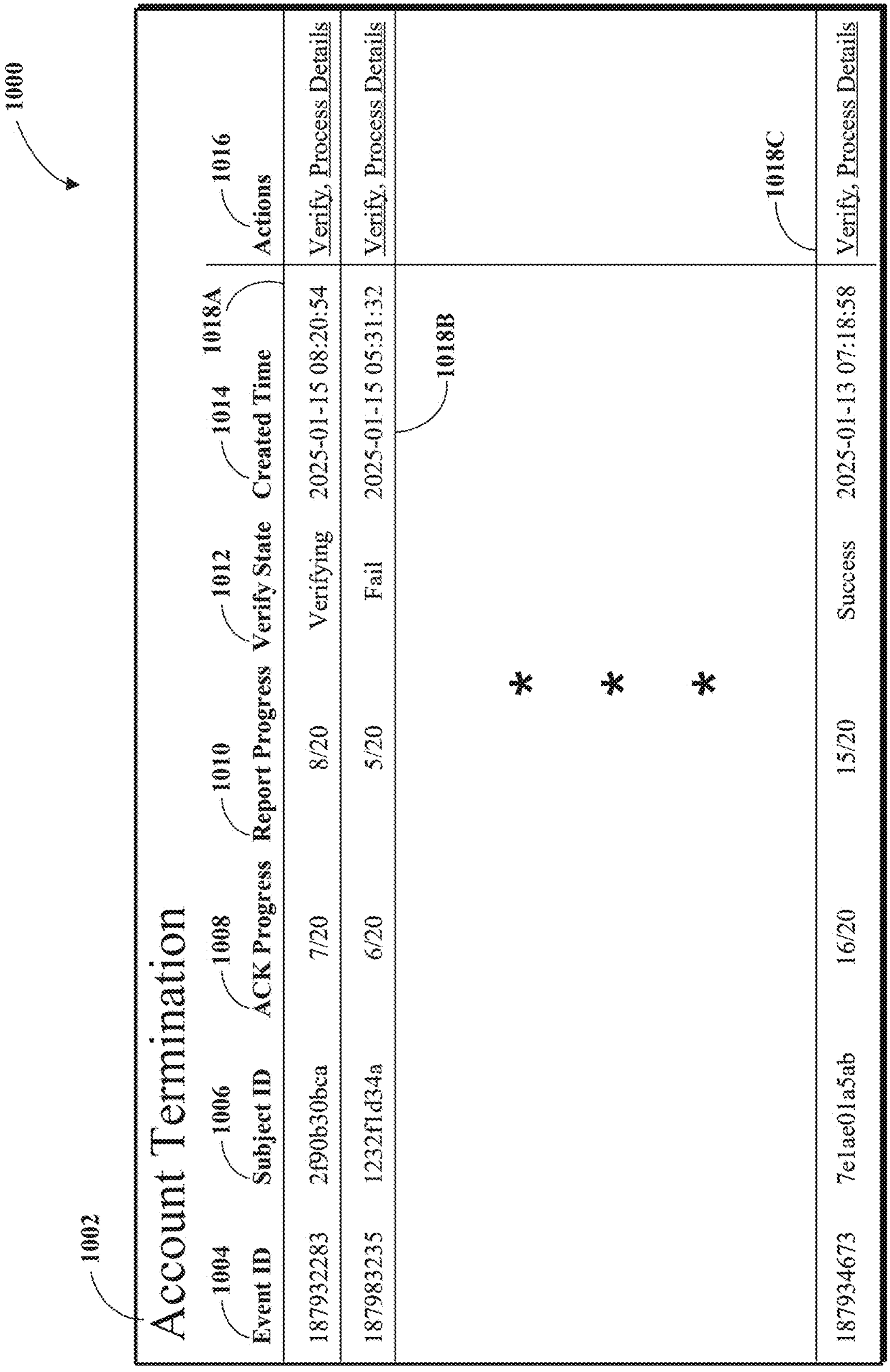
FIG. 10 is an illustration of an example graphical user interface (GUI) of an account termination report.

FIG. 10 is an illustration of an example GUI of an account termination report 1000. The account termination report 1000 provides a structured interface for tracking and managing account termination events within a software platform, such as the software platform 300 of FIG. 3. The account termination report may be output for display to an interface, such as the interface software 406 of FIG. 4. The account termination report 1000 presents a tabular display of termination-related records, facilitating real-time monitoring of termination requests, progress tracking, and verification states. The account termination report 1000 allows a user (e.g., a system administrator, compliance officer), via a client device, such as the client device 408 of FIG. 4, to oversee the execution of account terminations and validate compliance with internal policies and regulatory requirements.

At the top of the interface, a title 1002 "Account Termination" serves as a heading to indicate the purpose of the displayed report. Below the title, the report is structured as a table with multiple columns representing key attributes associated with each account termination event. The first column, labeled Event ID 1004, provides a unique identifier for each account termination event, allowing user to reference and track specific requests. The second column, Subject ID 1006, corresponds to the identifier of the entity (e.g., user account) undergoing termination. The Subject ID is an anonymous identifier associated with the entity generated using a hashing algorithm (e.g., SHA-256, HMAC).

The third column, ACK Progress 1008, displays an acknowledgment progress indicator, showing the number of acknowledgment steps completed out of the total required steps. The ACK Progress 1008 provides insight into whether relevant systems, such as, but not limited to, authentication services, access control mechanisms, or data repositories, have acknowledged the termination event. The fourth column, Report Progress 1010, represents the completion status of required compliance reports, such as, but not limited to, data retention verification, access revocation logs, or regulatory filings.

The fifth column, Verify State 1012, indicates the current verification status of the termination process. For example, Verify State 1012 may include, but is not limited to Verifying, Fail, or Success. In this case, Verifying denotes that the termination request is undergoing validation checks. Fail signifies that the termination process encountered an issue, such as a failure to revoke access permissions, a data deletion policy violation, or the like. Success confirms that the termination request has been fully executed and validated.

The sixth column, Created Time 1014, displays a timestamp indicating when the termination request was generated. The timestamp provides a chronological reference for tracking pending or completed terminations and facilitates audit logging for compliance and security analysis. The seventh column, Actions 1016, includes interactive elements such as Verify and Process Details, allowing administrators to drill down into the specifics of a termination event. By selecting Verify, an administrator can initiate or review additional validation steps. The Process Details option enables a deeper examination of event metadata, such as execution logs, policy enforcement status, and associated remediation actions.

The account termination report 1000 includes three rows 1018A, 1018B, and 1018C for demonstrative purposes; however, the account termination report may include more or fewer rows.

In some implementations, the account termination report 1000 can integrate with automated policy enforcement mechanisms, in which case, the system can cross-reference termination events with predefined compliance rules. If a failure occurs such as, a failure to revoke all access tokens, the system may trigger an automated remediation workflow, escalate the issue to a compliance officer, or generate alerts within a dashboard of the system.

In some implementations, the account termination report 1000 includes real-time synchronization with external data repositories, such as employee directories, authentication servers, third-party identity management systems, or the like. The real-time synchronization facilitates comprehensive terminations, reducing the risk of orphaned accounts retaining unauthorized access.

In another example, the system may provide automated status updates within the account termination interface 1000 based on predefined workflows. For example, if a termination verification process is delayed due to incomplete acknowledgment steps, the system may automatically notify administrators and recommend or perform corrective actions.

Figure 11:
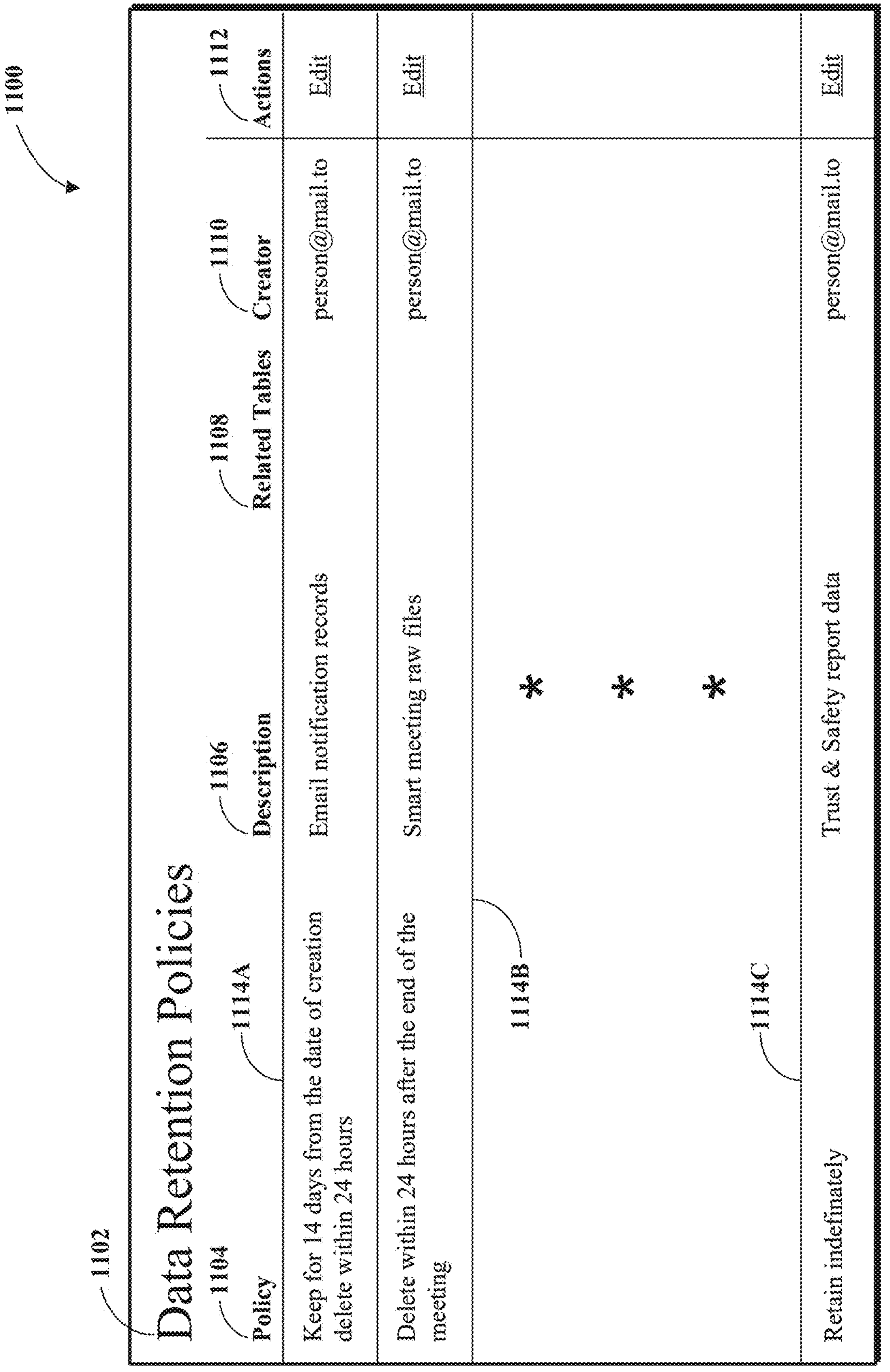
FIG. 11 is an illustration of an example GUI of a data retention policy management.

FIG. 11 is an illustration of an example GUI of a data retention policy management interface. The data retention policy management interface 1100 facilitates the definition, modification, and enforcement of data retention policies within a software platform, such as the software platform 300 of FIG. 3. The data retention policy management interface 1100 enables users to configure rules governing data storage durations, automatic deletion schedules, and compliance-related record-keeping. A user may access the data retention policy management interface 1100 via a client device, such as the client device 408 of FIG. 4, to create, update, or review data retention policies.

At the top of the data retention policy management interface 1100, the title 1102 "Data Retention Policies" provides a clear heading that contextualizes the purpose of the displayed information. The data retention policy management interface 1100 is structured as a table that organizes data retention policies in a format that allows for efficient review and management. The table includes multiple columns representing key attributes of each policy, including a policy identifier 1104, a description field 1106, related tables 1108, a creator identifier 1110, and available actions 1112.

The policy identifier 1104 specifies the conditions governing data retention and deletion. For instance, in row 1114A, a policy specifies that email notification records should be retained for 14 days from the date of creation and deleted within 24 hours thereafter. Another policy, in row 1114B, dictates that smart meeting raw files should be deleted within 24 hours after the end of a meeting. Additionally, row 1114C includes a policy indicating that trust and safety report data should be retained indefinitely. Each policy is associated with a unique retention rule that aligns with regulatory or operational compliance requirements.

The description field 1106 provides additional contextual information regarding the purpose and scope of each policy. For example, the policy in row 1114A applies specifically to email notification records, while the policy in row 1114B pertains to smart meeting raw files. The related tables field 1108 identifies the database tables or data structures affected by the retention policy. This help users trace the scope of each policy to the corresponding datasets within the system.

The creator identifier 1110 specifies the user or system entity responsible for defining the policy. This field facilitates auditability and accountability in policy creation and modification. The actions field 1112 provides interactive options, such as an "Edit" link, which allow authorized users to modify the corresponding retention policy. Selecting the "Edit" link may launch a configuration panel or modal window where users can adjust retention durations, modify deletion schedules, or assign new ownership for policy enforcement.

In some implementations, the data retention policy management interface 1100 supports dynamic policy enforcement. For example, policies that define automatic deletion schedules may trigger execution workflows within a data governance system, such as the agent-based data operations system 400 of FIG. 4. Additionally, retention policies that require indefinite storage may trigger compliance validation mechanisms to adhere to regulatory frameworks such as, but not limited to, GDPR, CCPA, or HIPAA.

The implementations of this disclosure correspond to methods, non-transitory computer readable media, apparatuses, systems, devices, and the like. In some implementations, a method comprises receiving a data operation request in response to an occurrence of an event detected by a software platform, wherein the event is caused by at least one of a data subject request, an account termination, a user termination, or an expiration of a data retention period; performing, in response to the data operation request, one or more data operations across one or more data repositories, wherein the one or more data operations include at least one of a data deletion operation, a data retrieval operation, or a data modification operation; monitoring, by a monitoring agent of the software platform, a performance of the one or more data operations in real-time; updating, automatically based on an execution status of at least one of the one or more data operations identified based on the monitoring by the monitoring agent, a validation report including a timestamp of the execution status, and an operational outcome of a respective data operation; and outputting the validation report to a dashboard within a user interface. In some implementations, a non-transitory computer readable storage device including program instructions that, when executed by a processor cause the processor to perform operations the operations comprising receiving a data operation request in response to an occurrence of an event caused by at least one of a data subject request, an account termination, a user termination, or an expiration of a data retention period, detected by a software platform; performing, in response to the data operation request, one or more data operations across one or more data repositories, wherein the one or more data operations include at least one of a data deletion operation, a data retrieval operation, or a data modification operation; monitoring, by a monitoring agent of the software platform, a performance of the one or more data operations in real-time; updating, automatically based on an execution status of at least one of the one or more data operations identified based on the monitoring by the monitoring agent, a validation report including a timestamp of the execution status, and an operational outcome of a respective data operation; and outputting the validation report to a dashboard within a user interface. In some implementations, a system, comprising a memory subsystem configured to store instructions; and processing circuitry configured to execute instructions to receive a data operation request in response to an occurrence of an event caused by at least one of a data subject request, an account termination, a user termination, or an expiration of a data retention period, detected by a software platform; perform, in response to the data operation request, one or more data operations across one or more data repositories, wherein the one or more data operations include at least one of a data deletion operation, a data retrieval operation, or a data modification operation; monitor, by a monitoring agent of the software platform, a performance of the one or more data operations in real-time; update, automatically based on an execution status of at least one of the one or more data operations identified based on the monitoring by the monitoring agent, a validation report including a timestamp of the execution status, and an operational outcome of a respective data operation; and output the validation report to a dashboard within a user interface.

In some implementations of the method, non-transitory computer readable medium, or system, the method comprises, the operations comprise, and the processing circuitry is configured to execute instructions for detecting an anomaly based on the one or more data operations monitored by the monitoring agent, wherein the anomaly includes at least one of a failed data operation, an unexpected delay beyond a threshold period, or an inconsistent data validation result, wherein the threshold period is dynamically determined based on historical execution times or predefined system performance benchmarks; and generating an alert in response to detecting the anomaly.

In some implementations of the method, non-transitory computer readable medium, or system, performing the one or more data operations comprises setting a priority of the one or more data operations based on a predefined compliance rule including at least one of a data retention policy, a regulatory deadline, or a data sensitivity classification.

In some implementations of the method, non-transitory computer readable medium, or system, the dashboard is a compliance dashboard configured to display at least one of a real-time execution status, an anomaly alert, or the validation report.

In some implementations of the method, non-transitory computer readable medium, or system, the one or more data operations are distributed across the one or more data repositories to execute in parallel.

In some implementations of the method, non-transitory computer readable medium, or system, the one or more data operations are configured to retry a dynamically adjusted number of times in response to a failure condition including at least one of a network disruption, a database lock error, or a timeout event, and the dynamically adjusted number of times is based on the failure condition.

In some implementations of the method, non-transitory computer readable medium, or system, the method comprises, the operations comprise, and the processing circuitry is configured to execute instructions for detecting an unauthorized data modification within the one or more data repositories; and triggering a remediation operation to restore at least one of the one or more data repositories from a secure backup.

In some implementations of the method, non-transitory computer readable medium, or system, the monitoring agent logs execution metrics including processing time, error rates, and system load, for performance analysis and optimization.

In some implementations of the method, non-transitory computer readable medium, or system, the method comprises, the operations comprise, and the processing circuitry is configured to execute instructions for identifying an operational discrepancy associated with at least one of the one or more data operations based on the monitoring by the monitoring agent, wherein the operational discrepancy includes at least one of a data operation failure, an execution time exceeding a threshold period, or an inconsistency in a validation check; and generating an alert in response to the operational discrepancy.

In some implementations of the method, non-transitory computer readable medium, or system, the method comprises, the operations comprise, and the processing circuitry is configured to execute instructions for assigning a level of urgency to the one or more data operations based on one or more compliance-related policies, the one or more compliance-related policies including at least one of a mandatory retention period, a legal deadline, or a classification of data sensitivity.

In some implementations of the method, non-transitory computer readable medium, or system, the method comprises, the operations comprise, and the processing circuitry is configured to execute instructions for configuring the dashboard to present at least one of a real-time operational insight, a notification for a detected discrepancy, or the validation report.

In some implementations of the method, non-transitory computer readable medium, or system, the one or more data operations are distributed between the one or more data repositories for simultaneous execution.

In some implementations of the method, non-transitory computer readable medium, or system, the method comprises, the operations comprise, and the processing circuitry is configured to execute instructions for initiating, in response to a failed data operation, a retry sequence that dynamically modifies a retry parameter based on a type of failure, wherein the retry parameter includes at least one of an increased wait interval for a subsequent retry, a change in a level of urgency, or an alternative execution path.

In some implementations of the method, non-transitory computer readable medium, or system, the method comprises, the operations comprise, and the processing circuitry is configured to execute instructions for initiating a corrective action, in response to identifying an unauthorized modification within at least one of the one or more data repositories, to restore an affected data from a secure backup.

In some implementations of the method, non-transitory computer readable medium, or system, the method comprises, the operations comprise, and the processing circuitry is configured to execute instructions to detect an irregularity in an execution of at least one of the one or more data operations based on monitoring by the monitoring agent, wherein the irregularity comprises at least one of a failed execution attempt, an unexpected processing delay exceeding a dynamically determined threshold, or an inconsistency in data integrity verification; and initiate a response that includes at least one of generating a real-time alert, adjusting execution parameters, or triggering a remediation process.

In some implementations of the method, non-transitory computer readable medium, or system, the method comprises, the operations comprise, and the processing circuitry is configured to execute instructions to assign a processing priority to the one or more data operations based on one or more governance policies, wherein the one or more governance policies include at least one of a mandatory data retention directive, a regulatory compliance timeframe, or a categorization of data sensitivity; and dynamically reorder an execution sequence of the one or more data operations based on the processing priority.

In some implementations of the method, non-transitory computer readable medium, or system, the method comprises, the operations comprise, and the processing circuitry is configured to execute instructions to store one or more operational metrics associated with an execution performance of at least one of the one or more data operations, wherein the one or more operational metrics include at least one of a processing duration, a failure frequency, and a resource utilization; and dynamically adjust a threshold for anomaly detection and failure recovery based on the one or more operational metrics.

In some implementations of the method, non-transitory computer readable medium, or system, the method comprises, the operations comprise, and the processing circuitry is configured to execute instructions to detect an unauthorized alteration within at least one of the one or more data repositories; and in response, execute a corrective procedure to restore an affected data to a previous state from a secure backup.

As used herein, unless explicitly stated otherwise, any term specified in the singular may include its plural version. For example, "a computer that stores data and runs software," may include a single computer that stores data and runs software or two computers-a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively, or in addition, the memory subsystem may include data or instructions or be configured to store instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an application-specific integrated circuit (ASIC)), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method comprising:

receiving, by an execution pipeline of a software platform, a data operation request associated with one or more data repositories in response to an event detected by the software platform;

evaluating, for each execution node of the execution pipeline, a set of operational metrics including available computational resources and a current execution queue congestion of the respective execution node;

selecting, for each data repository of the one or more data repositories, the respective execution node of the execution pipeline based on the available computational resources and the current execution queue congestion of the respective execution node to prevent an overload of the respective execution node and reduce a computational bottleneck of the execution pipeline;

performing, at the respective execution node based on the data operation request, one or more data operations across the one or more data repositories concurrently, wherein the one or more data operations are executed in parallel across the one or more data repositories and the one or more data operations include at least one of a data deletion operation, a data retrieval operation, or a data modification operation;

monitoring, by a monitoring agent of the software platform, an execution status of the one or more data operations in real-time;

updating, automatically based on the execution status of at least one of the one or more data operations identified based on the monitoring by the monitoring agent, a validation report including a timestamp of the execution status, and an operational outcome of a respective data operation; and outputting the validation report to a dashboard within a user interface.

2. The method of claim 1, comprising:

detecting an anomaly based on the one or more data operations monitored by the monitoring agent, wherein the anomaly includes at least one of a failed data operation, an unexpected delay beyond a threshold period, or an inconsistent data validation result, wherein the threshold period is dynamically determined based on historical execution times or predefined system performance benchmarks; and generating an alert in response to detecting the anomaly.

3. The method of claim 1, wherein performing the one or more data operations comprises:

setting a priority of the one or more data operations based on a predefined compliance rule including at least one of a data retention policy, a regulatory deadline, or a data sensitivity classification.

4. The method of claim 1, wherein the dashboard is a compliance dashboard configured to display at least one of a real-time execution status, an anomaly alert, or the validation report.

5. The method of claim 1, wherein the one or more data operations are configured to retry a dynamically adjusted number of times in response to a failure condition including at least one of a network disruption, a database lock error, or a timeout event, and the dynamically adjusted number of times is based on the failure condition.

6. The method of claim 1, comprising:

detecting an unauthorized data modification within the one or more data repositories; and triggering a remediation operation to restore at least one of the one or more data repositories from a secure backup.

7. The method of claim 1, comprising: storing, by the monitoring agent, the execution status including processing time, error rates, and system load, for performance analysis and optimization.

8. A non-transitory computer-readable medium including program instructions that, when executed by a processor cause the processor to perform operations, the operations comprising:

Receiving, by an execution pipeline of a software platform, a data operation request associated with one or more data operations in response to an event detected by the software platform;

evaluating, for each execution node of the execution pipeline, a set of operational metrics including available computational resources and a current execution queue congestion of the respective execution node;

selecting, for each data repository of the one or more data repositories, the respective execution node of the execution pipeline based on the available computational resources and the current execution queue congestion of the respective execution node to prevent an overload of the respective execution node and reduce a computational bottleneck of the execution pipeline;

performing, at the respective execution node based on the data operation request, one or more data operations across the one or more data repositories concurrently, wherein the one or more data operations are executed in parallel across the one or more data repositories and the one or more data operations include at least one of a data deletion operation, a data retrieval operation, or a data modification operation;

monitoring, by a monitoring agent of the software platform, an execution status of the one or more data operations in real-time;

updating, automatically based on the execution status of at least one of the one or more data operations identified based on the monitoring by the monitoring agent, a validation report including a timestamp of the execution status, and an operational outcome of a respective data operation; and outputting the validation report to a dashboard within a user interface.

9. The non-transitory computer-readable medium of claim 8, the operations further comprising:

identifying an operational discrepancy associated with at least one of the one or more data operations based on the monitoring by the monitoring agent, wherein the operational discrepancy includes at least one of a data operation failure, an execution time exceeding a threshold period, or an inconsistency in a validation check; and generating an alert in response to the operational discrepancy.

10. The non-transitory computer-readable medium of claim 8, the operations further comprising:

assigning a level of urgency to the one or more data operations based on one or more compliance-related policies, the one or more compliance-related policies including at least one of a mandatory retention period, a legal deadline, or a classification of data sensitivity.

11. The non-transitory computer-readable medium of claim 8, the operations further comprising:

configuring the dashboard to present at least one of a real-time operational insight, a notification for a detected discrepancy, or the validation report.

12. The non-transitory computer-readable medium of claim 8, wherein the one or more data operations are distributed between the one or more data repositories for simultaneous execution.

13. The non-transitory computer-readable medium of claim 8, the operations further comprising:

initiating, in response to a failed data operation, a retry sequence that dynamically modifies a retry parameter based on a type of failure, wherein the retry parameter includes at least one of an increased wait interval for a subsequent retry, a change in a level of urgency, or an alternative execution path.

14. The non-transitory computer-readable medium of claim 8, the operations further comprising:

initiating a corrective action, in response to identifying an unauthorized modification within at least one of the one or more data repositories, to restore an affected data from a secure backup.

15. A system, comprising:

a memory subsystem configured to store instructions; and processing circuitry configured to execute instructions to:

receive, by an execution pipeline of a software platform, a data operation request associated with one or more data repositories in response to an event detected by the software platform;

evaluate, for each execution node of the execution pipeline, a set of operational metrics including available computational resources and a current execution queue congestion of the respective execution node;

select, for each data repository of the one or more data repositories, the respective execution node of the execution pipeline based on the available computational resources and the current execution queue congestion of the respective execution node to prevent an overload of the respective execution node and reduce a computational bottleneck of the execution pipeline;

perform, at the respective execution node based on the data operation request, one or more data operations across the one or more data repositories concurrently, wherein the one or more data operations are executed in parallel across the one or more data repositories and the one or more data operations include at least one of a data deletion operation, a data retrieval operation, or a data modification operation;

monitor, by a monitoring agent of the software platform, an execution status of the one or more data operations in real-time;

update, automatically based on the execution status of at least one of the one or more data operations identified based on the monitoring by the monitoring agent, a validation report including a timestamp of the execution status, and an operational outcome of a respective data operation; and output the validation report to a dashboard within a user interface.

16. The system of claim 15, wherein the processing circuitry is further configured to execute instructions to:

detect an irregularity in an execution of at least one of the one or more data operations based on monitoring by the monitoring agent, wherein the irregularity comprises at least one of a failed execution attempt, an unexpected processing delay exceeding a dynamically determined threshold, or an inconsistency in data integrity verification; and initiate a response that includes at least one of generating a real-time alert, adjusting execution parameters, or triggering a remediation process.

17. The system of claim 15, wherein the processing circuitry is further configured to execute instructions to:

assign a processing priority to the one or more data operations based on one or more governance policies, wherein the one or more governance policies include at least one of a mandatory data retention directive, a regulatory compliance timeframe, or a categorization of data sensitivity; and dynamically reorder an execution sequence of the one or more data operations based on the processing priority.

18. The system of claim 15, wherein the processing circuitry is further configured to execute instructions to:

store one or more operational metrics associated with an execution performance of at least one of the one or more data operations, wherein the one or more operational metrics include at least one of a processing duration, a failure frequency, and a resource utilization; and dynamically adjust a threshold for anomaly detection and failure recovery based on the one or more operational metrics.

19. The system of claim 15, wherein the processing circuitry is further configured to execute instructions to:

detect an unauthorized alteration within at least one of the one or more data repositories; and in response, execute a corrective procedure to restore an affected data to a previous state from a secure backup.

20. The method of claim 1, wherein performing the one or more data operations comprises:

grouping, based on a similarity among the one or more data operations, at least two of the one or more of the one or more data operations into a batch; and executing the batch during a non-peak time period.

* * * * *